(12) United States Patent
Baumgartner et al.

(10) Patent No.: US 12,105,487 B2
(45) Date of Patent: Oct. 1, 2024

(54) CONTROL SYSTEM FOR BUILDING EQUIPMENT WITH OPTIMIZATION SEARCH REDUCTION BASED ON EQUIPMENT MODELS AND PARAMETERS

(71) Applicant: Tyco Fire & Security GmbH, Neuhausen am Rheinfall (CH)

(72) Inventors: Ryan A. Baumgartner, Milwaukee, WI (US); Homero L. Noboa, Glendale, WI (US); Zachary J. Sienkiewicz, New Berlin, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 523 days.

(21) Appl. No.: 17/560,799

(22) Filed: Dec. 23, 2021

(65) Prior Publication Data

US 2023/0176534 A1    Jun. 8, 2023

Related U.S. Application Data

(60) Provisional application No. 63/286,523, filed on Dec. 6, 2021.

(51) Int. Cl.
*G05B 15/02* (2006.01)
(52) U.S. Cl.
CPC .................. *G05B 15/02* (2013.01)
(58) Field of Classification Search
CPC .............. G05B 15/02; G05B 9/03; G05B 2219/2642
See application file for complete search history.

(56) References Cited

U.S. PATENT DOCUMENTS 9,447,985 B2    9/2016    Johnson
9,798,336 B2   10/2017    Przybylski
(Continued)

FOREIGN PATENT DOCUMENTS

CA    2957726 A1    3/2016
CA    3043996 A1    2/2018
(Continued)

OTHER PUBLICATIONS

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
(Continued)

*Primary Examiner* — Charles R Kasenge
(74) *Attorney, Agent, or Firm* — Foley & Lardner LLP

(57) ABSTRACT

A system for controlling building equipment devices includes a processing circuit comprising a processor and memory storing instructions executed by the processor. The system is configured to generate a first combination profile indicating a number of active devices within each of one or more device groups according to a first combination of the building equipment devices, and generate a second combination profile indicating a number of active devices within each of the one or more device groups according to a second combination of the building equipment devices. The system is also configured to compare the first combination profile against the second combination profile to determine whether the first combination is redundant with the second combination, generate control decisions for the building equipment devices based on whether the first combination is redundant with the second combination, and operate the building equipment devices in accordance with the control decisions.

14 Claims, 10 Drawing Sheets

(56) References Cited

U.S. PATENT DOCUMENTS

| | | | |
|---|---|---|---|
| 10,101,731 | B2 | 10/2018 | Asmus et al. |
| 10,514,178 | B2 | 12/2019 | Willmott et al. |
| 10,558,178 | B2 | 2/2020 | Willmott et al. |
| 10,838,441 | B2 | 11/2020 | Ostrye |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 10,969,135 | B2 | 4/2021 | Willmott et al. |
| 11,092,352 | B2 | 8/2021 | Willmott et al. |
| 11,156,978 | B2 | 10/2021 | Johnson et al. |
| 2015/0316903 | A1 | 11/2015 | Asmus et al. |
| 2017/0104345 | A1 | 4/2017 | Wenzel et al. |
| 2017/0152310 | A1 | 6/2017 | Barbour et al. |
| 2018/0196456 | A1 | 7/2018 | Elbsat |
| 2018/0197253 | A1 | 7/2018 | Elbsat et al. |
| 2018/0285800 | A1 | 10/2018 | Wenzel et al. |
| 2018/0357577 | A1 | 12/2018 | Elbsat et al. |
| 2019/0079473 | A1 | 3/2019 | Kumar et al. |
| 2022/0110203 | A1* | 4/2022 | Eiding ................. H05B 47/175 |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U.C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

CONTROL SYSTEM FOR BUILDING EQUIPMENT WITH OPTIMIZATION SEARCH REDUCTION BASED ON EQUIPMENT MODELS AND PARAMETERS

CROSS-REFERENCE TO RELATED PATENT APPLICATIONS

The application claims the benefit of and priority to U.S. Provisional Patent Application No. 63/286,523 filed Dec. 6, 2021, the entire disclosure of which is incorporated by reference herein.

BACKGROUND

The present disclosure relates generally to a central plant or central energy facility configured to serve the energy loads of a building or campus. The present disclosure relates more particular to a central plant with an asset allocator configured to determine an optimal distribution of the energy loads across various subplants of the central plant.

A central plant typically includes multiple subplants configured to serve different types of energy loads. For example, a central plant may include a chiller subplant configured to serve cooling loads, a heater subplant configured to serve heating loads, and/or an electricity subplant configured to serve electric loads. A central plant purchases resources from utilities to run the subplants to meet the loads.

Some central plants include energy storage. Energy storage may be a tank of water that stores hot water for campus heating, an ice tank for campus cooling, and/or battery storage. In the presence of real-time pricing from utilities, it may be advantageous to manipulate the time that a certain resource or energy type is consumed. Instead of producing the resource exactly when it is required by the load, it can be optimal to produce that resource at a time when the production cost is low, store it, and then use it when the resource needed to produce that type of energy is more expensive. It can be difficult and challenging to optimally allocate the energy loads across the assets of the central plant.

SUMMARY

One implementation of the present disclosure is a system for controlling building equipment devices. The system includes a processing circuit comprising a processor and memory storing instructions executed by the processor. The processing circuit is configured to generate a first combination profile indicating a number of active devices within each of one or more device groups according to a first combination of the building equipment devices, and generate a second combination profile indicating a number of active devices within each of the one or more device groups according to a second combination of the building equipment devices. The processing circuit is also configured to compare the first combination profile against the second combination profile to determine whether the first combination is redundant with the second combination, and generate control decisions for the building equipment devices based on whether the first combination is redundant with the second combination. The processing circuit is also configured to operate the building equipment devices in accordance with the control decisions.

In some embodiments, in response to determining the first combination profile and the second combination profile are redundant, the system is configured to store the first combination profile in a database and eliminate the second combination.

In some embodiments, in response to determining the first combination and the second combination are not redundant, the system is configured to store the first combination profile and the second combination profile in a database.

In some embodiments, the system is also configured to generate a third combination profile indicating a number of active devices within each of the one or more device groups according to a third combination of the building equipment devices. The processing circuit is further configured to compare the third combination profile against existing combination profiles stored in the database.

In some embodiments, in response to determining the third combination and existing combinations stored in the database are not redundant, the system is configured to store the third combination profile in the database.

In some embodiments, the system is also configured to generate a database including a plurality of combinations of building equipment devices indicating a number of active devices within each of the one or more device groups according to the plurality of combinations of building equipment devices. The processing circuit is further configured to save a first combination profile in the database indicating a number of active devices within each of the one or more device groups according to a first combination of the building equipment devices.

In some embodiments, in response to determining the first combination and a second combination are redundant, the system is further configured to delete the second combination from the database.

Another implementation of the present disclosure is a system for controlling building equipment. The system comprises a processing circuit comprising a processor and memory storing instructions executed by the processor. The processing circuit is configured to categorize a first building equipment device and a second building equipment device into either a single device group or into different device groups by comparing a first set of device attributes of the first building equipment device to a second set of device attributes of the second building equipment device. The processing circuit is further configured to generate control decisions for the first building equipment device and the second building equipment device based on whether the first building equipment device and the second building equipment device are categorized into the single device group or into the different device groups, and operate the first building equipment device and the second building equipment device according to the control decisions.

In some embodiments, the system is further configured to obtain a first set of equipment performance data characterizing an operating performance of the first building equipment device and a second set of equipment performance data characterizing an operating performance of the second building equipment device. The system is also configured to generate the first set of device attributes of the first building equipment device based on the first set of equipment performance data and the second set of device attributes of the second building equipment device based on the second set of equipment performance data.

In some embodiments, the first set of device attributes of the first building equipment device includes a first equipment model coefficient and the second set of device attributes of the second building equipment device includes a second equipment model coefficient.

In some embodiments, the first set of device attributes of the first building equipment device includes a first device parameter and the second set of device attributes of the second building equipment device includes a second device parameter.

In some embodiments, in response to the first set of device attributes of the first building equipment device and the second set of device attributes of the second building equipment device being similar, the system is further configured categorize the first building equipment device and the second building equipment device into the single device group.

In some embodiments, the system is further configured to determine the first set of device attributes of the first building equipment device and the second set of device attributes of the second building equipment device are similar based on an error between the first set of device attributes and the second set of device attributes being below a threshold.

In some embodiments, the system is further configured to determine the first set of device attributes of the first building equipment device and the second set of device attributes of the second building equipment device are similar based on a difference between the first set of device attributes and the second set of device attributes being below a threshold.

In some embodiments, in response to the first set of device attributes of the first building equipment device and the second set of device attributes of the second building equipment device not being similar, the system is further configured to categorize the first building equipment device and the second building equipment device into the different device groups.

Another implementation of the present disclosure is a method for controlling building equipment devices. The method comprises generating a first combination profile indicating a number of active devices within each of one or more device groups according to a first combination of the building equipment devices. The method also comprises generating a second combination profile indicating a number of active devices within each of the one or more device groups according to a second combination of the building equipment devices, and comparing the first combination profile against the second combination profile to determine whether the first combination is redundant with the second combination. The method further comprises generating control decisions for the building equipment devices based on whether the first combination is redundant with the second combination, and operating the building equipment devices in accordance with the control decisions.

In some embodiments, response to determining the first combination and the second combination are redundant, the method further comprises storing the first combination profile in a database and eliminating the second combination.

In some embodiments, in response to determining the first combination and the second combination are not redundant, the method further comprises storing the first combination profile and the second combination profile in a database.

In some embodiments, the method further comprises generating a third combination profile indicating a number of active devices within each of the one or more device groups according to a third combination of the building equipment devices, and comparing the third combination profile against existing profiles stored in the database.

In some embodiments, in response to determining the third combination and existing combinations stored in the database are not redundant, the method further comprises storing the third profile in the database.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
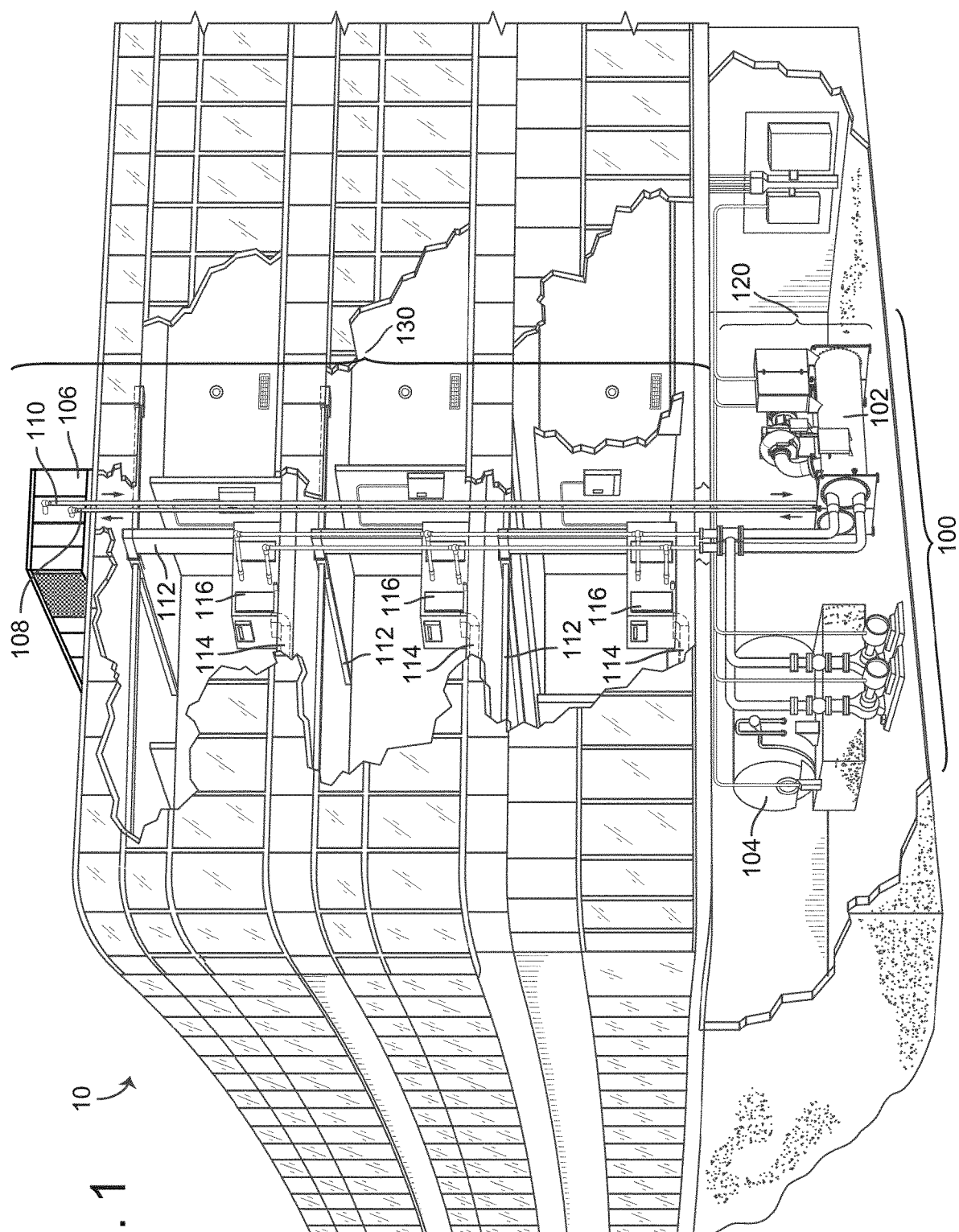
FIG. 1 is a drawing of a building equipped with a HVAC system, according to an exemplary embodiment.

Referring generally to the FIGURES, a central plant with an asset allocator and components thereof are shown, according to various exemplary embodiments. The asset allocator can be configured to manage energy assets such as central plant equipment, battery storage, and other types of equipment configured to serve the energy loads of a building. The asset allocator can determine an optimal distribution of heating, cooling, electricity, and energy loads across different subplants (i.e., equipment groups) of the central plant capable of producing that type of energy.

In some embodiments, the asset allocator is configured to control the distribution, production, storage, and usage of resources in the central plant. The asset allocator can be configured to minimize the economic cost (or maximize the economic value) of operating the central plant over a duration of an optimization period. The economic cost may be defined by a cost function $J(x)$ that expresses economic cost as a function of the control decisions made by the asset allocator. The cost function $J(x)$ may account for the cost of resources purchased from various sources, as well as the revenue generated by selling resources (e.g., to an energy grid) or participating in incentive programs.

The asset allocator can be configured to define various sources, subplants, storage, and sinks. These four categories of objects define the assets of a central plant and their interaction with the outside world. Sources may include commodity markets or other suppliers from which resources such as electricity, water, natural gas, and other resources can be purchased or obtained. Sinks may include the requested loads of a building or campus as well as other types of resource consumers. Subplants are the main assets of a central plant. Subplants can be configured to convert resource types, making it possible to balance requested loads from a building or campus using resources purchased from the sources. Storage can be configured to store energy or other types of resources for later use.

In some embodiments, the asset allocator performs an optimization process to determine an optimal set of control decisions for each time step within the optimization period. The control decisions may include, for example, an optimal amount of each resource to purchase from the sources, an optimal amount of each resource to produce or convert using the subplants, an optimal amount of each resource to store or remove from storage, an optimal amount of each resource to sell to resources purchasers, and/or an optimal amount of each resource to provide to other sinks. In some embodiments, the asset allocator is configured to optimally dispatch all campus energy assets (i.e., the central plant equipment) in order to meet the requested heating, cooling, and electrical loads of the campus for each time step within the optimization period. These and other features of the asset allocator are described in greater detail below.

In some embodiments, the central plant includes a low level optimizer configured to generate control decisions for the individual devices within each subplant in order to meet the requested subplant loads. For example, the asset allocator may provide the low level optimizer with a subplant-specific load for each subplant (e.g., a heating load for the heater subplant, a cooling load for the chiller subplant, an electric load for an electricity subplant, etc.) that defines the requested load to be served by that subplant as a whole (i.e., by any combination of devices within that subplant). The low level optimizer may select a particular combination of devices within each subplant to active or deactivate and/or generate operating setpoints for the devices within each subplant to satisfy the subplant-specific loads. The low level optimizer may use equipment performance data received from the asset allocator or from any other source to select an optimal combination of devices within each subplant. The equipment performance data may characterize the operating performance of one or more devices, which can be used by the low level optimizer to minimize the economic cost (or maximize the economic value) of operating the one or more devices, as discussed above.

One challenge that arises when performing the low level optimization is that the low level optimizer may be required to evaluate a large number of different combinations of devices that could be active or inactive at a given time (e.g., at a time step of an optimization period) in order to determine the best combination of devices to satisfy the requested subplant loads. As used herein, the terms "combination," "device combination," "combinations of devices," and like terms refer to combinations of on/off or active/inactive statuses for a set of devices. For an extremely simple plant that only includes two devices, the low level optimizer would only need to evaluate four (i.e., $2^2$) unique combinations of active vs. inactive devices (i.e., Device A=on, Device B=on; Device A=on, Device B=off; Device A=off, Device B=on; Device A=off, Device B=off). These device combinations can be represented in vector form as [1, 1], [1, 0], [0, 1], and [0, 0] where "1" indicates that the corresponding device is to be on or active at the time step and "0" indicates that the corresponding device is to be off or inactive at the time step. However, for a central plant that includes thirty devices, the low level optimizer would need to evaluate over one billion (i.e., $2^{30}$) unique combinations of devices that could active or inactive at a given time to determine which of these combinations satisfies the requested subplant loads and results in the lowest energy consumption or cost. This can be problematic because the amount of time and computational resources required to evaluate each combination may render the low level optimization problem infeasible to complete in the limited amount of time available to generate the control decisions before advancing to the next time step.

To address this challenge, the low level optimizer can be configured to selectively eliminate certain combinations of devices to reduce the number of unique combinations that need to be evaluated when performing the low level optimization. In some embodiments, the low level optimizer generates or obtains device attribute data (e.g., equipment models, device parameters, etc.) for the devices within each subplant and categorizes the devices into one or more groups by comparing the device attribute data. Similar devices (e.g., devices having similar equipment models, device parameters, and/or other characteristics that satisfy predefined similarity criteria) may be categorized into the same group to create one or more groups of similar devices. As used herein, the terms "group," "device group," "similarity group," "similar device group," "group of similar devices," and like terms refer to the groups of devices that are considered sufficiently similar to be grouped together for purposes of performing the low level optimization. In other words, each group of similar devices may include a set of devices that can be considered functionally equivalent for purposes of performing the low level optimization. For example, a group of similar chillers may include one or more chillers that have similar minimum or maximum cooling capacities, similar equipment model parameters (e.g., parameters of a model that defines the relationship between chilled water production and electricity consumption for a given chiller), similar operating characteristics, or other factors that render the chillers within the group interchangeable or substantially equivalent for purposes of the low level optimization.

In some embodiments, the low level optimizer is configured to generate combination profiles for the various combinations to be evaluated. Each combination profile may correspond to a given combination of devices and may indicate the number of active devices within each of the one or more groups for that combination. For example, assuming that four different device groups were generated, the combination profile for a given combination can be expressed as [2, 0, 0, 3] which indicates that two devices within the first group are active, zero devices within the second group are active, zero devices within the third group are active, and three devices within the fourth group are active. Multiple different combinations of devices may have the same combination profile if the device combinations have the same total number of active devices within each group, regardless of which specific devices within each group are active or inactive.

In some embodiments, the low level optimizer compares the combination profiles for the different device combinations to determine whether any of the device combinations are redundant. Any two device combinations may be considered "redundant" if they have the same combination profile, even if the device combinations are not identical. For example, assuming the first similarity group of devices has three total devices, there would be a total of eight device combinations (i.e., [0, 0, 0], [0, 0, 1], [0, 1, 0], [0, 1, 1], [1, 0, 0], [1, 0, 1], [1, 1, 0], [1, 1, 1]) where "0" indicates that the corresponding device is to be off or inactive and "1" indicates that the corresponding device is to be on or active. However, these eight unique device combinations reduce to only four possible combination profile coefficients for the similarity group (i.e., 0, 1, 2, and 3) indicating the total number of active devices within the similarity group. In this example, the second, third, and fifth device combinations would be considered redundant because they all have exactly one active device. Similarly, the fourth, sixth, and seventh device combinations would be considered redundant because they all have exactly two active devices. The reduction is even greater for similarity groups that have more than three devices. For example, a similarity group having five devices would have 32 (i.e., $2^5$) unique device combinations but only six possible combination profile coefficients (i.e., 0, 1, 2, 3, 4, and 5).

If a device combination is redundant with another device combination that is already set to be evaluated by the low level optimizer, the low level optimizer can eliminate or remove the redundant device combination from the set of device combinations to be evaluated (or decide to not add the redundant device combination to the set of device combinations to be evaluated if the device combination is not already part of the set). Advantageously, this process of categorizing similar devices, generating combination profiles, and eliminating/removing redundant device combinations reduces the total number of device combinations to be evaluated and allows the low level optimizer to determine an optimal combination of devices in the amount of time required to issue control decisions to the devices. These and other features of the low level optimizer are described in greater detail below.

As described herein, it is contemplated that the systems and methods described may be readily applied to various building equipment devices without departing from the teachings of the present disclosure. Building equipment devices may be a device of an HVAC system (e.g., heaters, chillers, air handling units, pumps, fans, thermal energy storage, etc., and/or any other device configured to provide heating, cooling, ventilation, or other services for a building), energy generation and/or storage devices (e.g., thermal storage tanks, battery banks, gas turbines, steam turbines, etc.), a device of a security system (e.g., occupancy sensors, video surveillance cameras, digital video recorders, video processing servers, intrusion detection devices, access control devices and servers, and/or other security-related devices), a device of a lighting system (e.g., light fixtures, ballasts, lighting sensors, dimmers, or other devices configured to controllably adjust the amount of light to a building, etc.), a device of a fire alerting system (e.g., fire detection devices, fire notification devices, fire suppression devices, etc.), and/or a device of any other system that is capable of managing building functions or devices, or any combination thereof.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
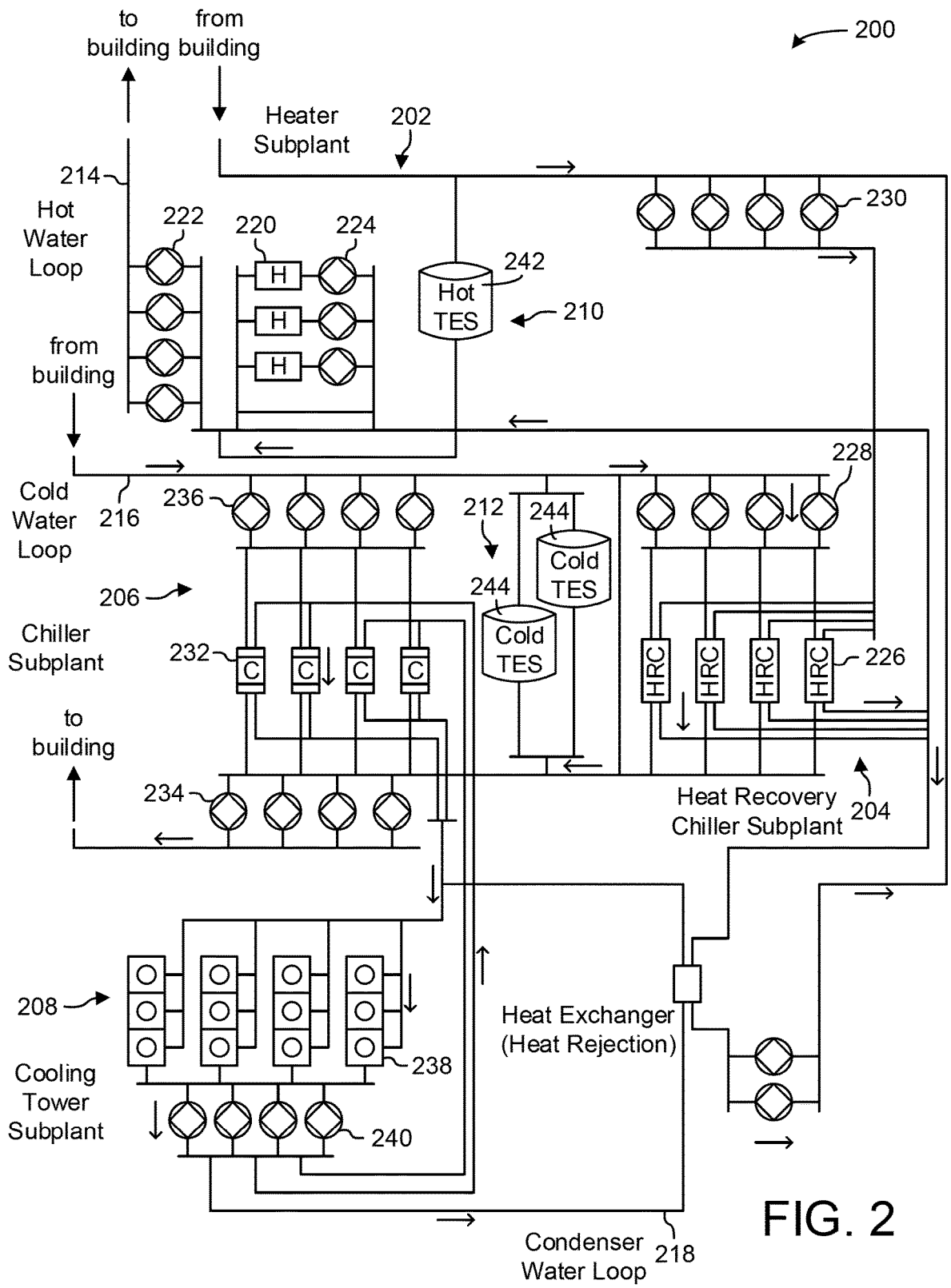
FIG. 2 is a block diagram of a central plant which can be used to serve the energy loads of the building of FIG. 1, according to an exemplary embodiment.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
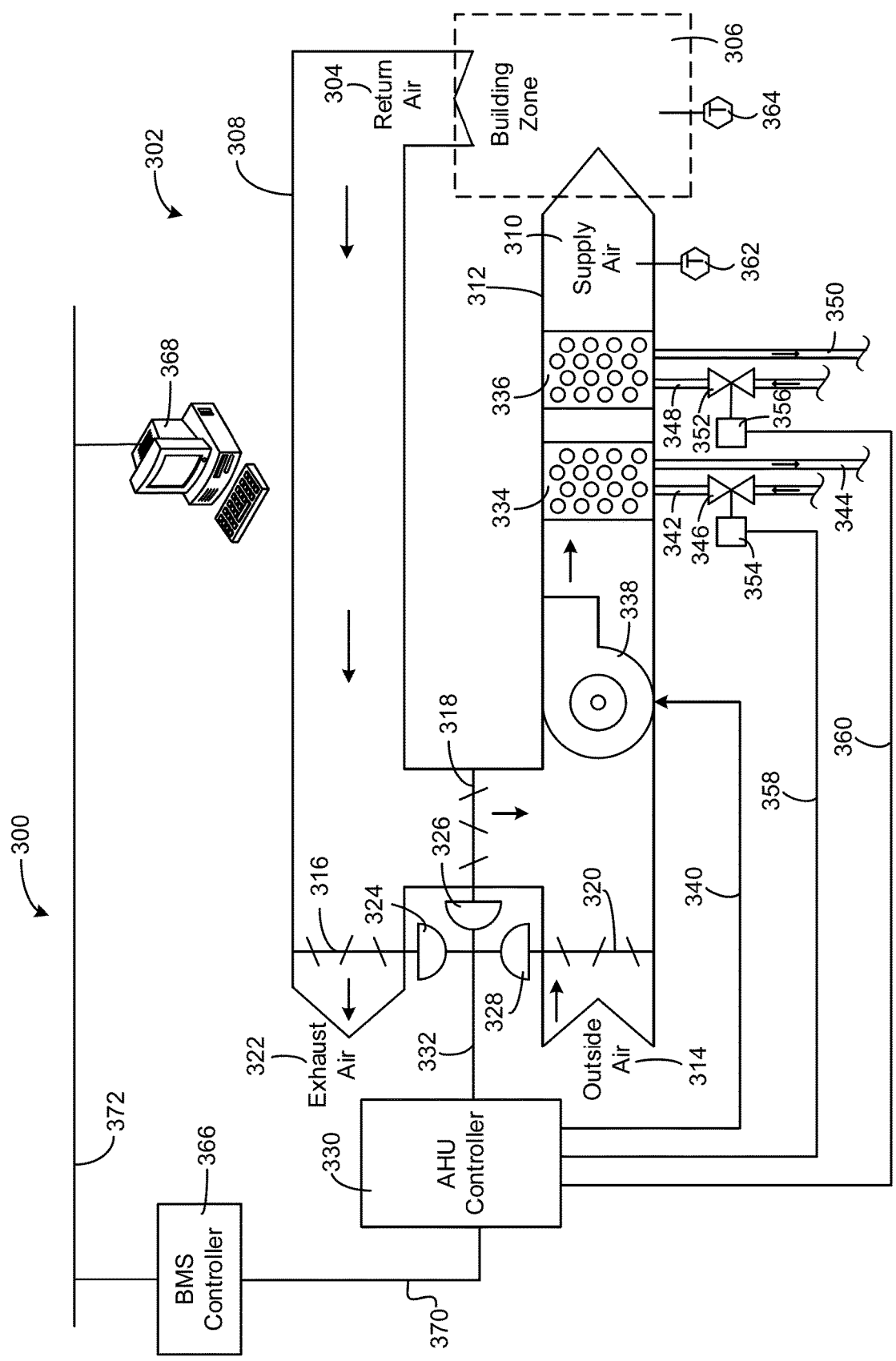
FIG. 3 is a block diagram of an airside system which can be implemented in the building of FIG. 1, according to an exemplary embodiment.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Asset Allocation System

Figure 4:
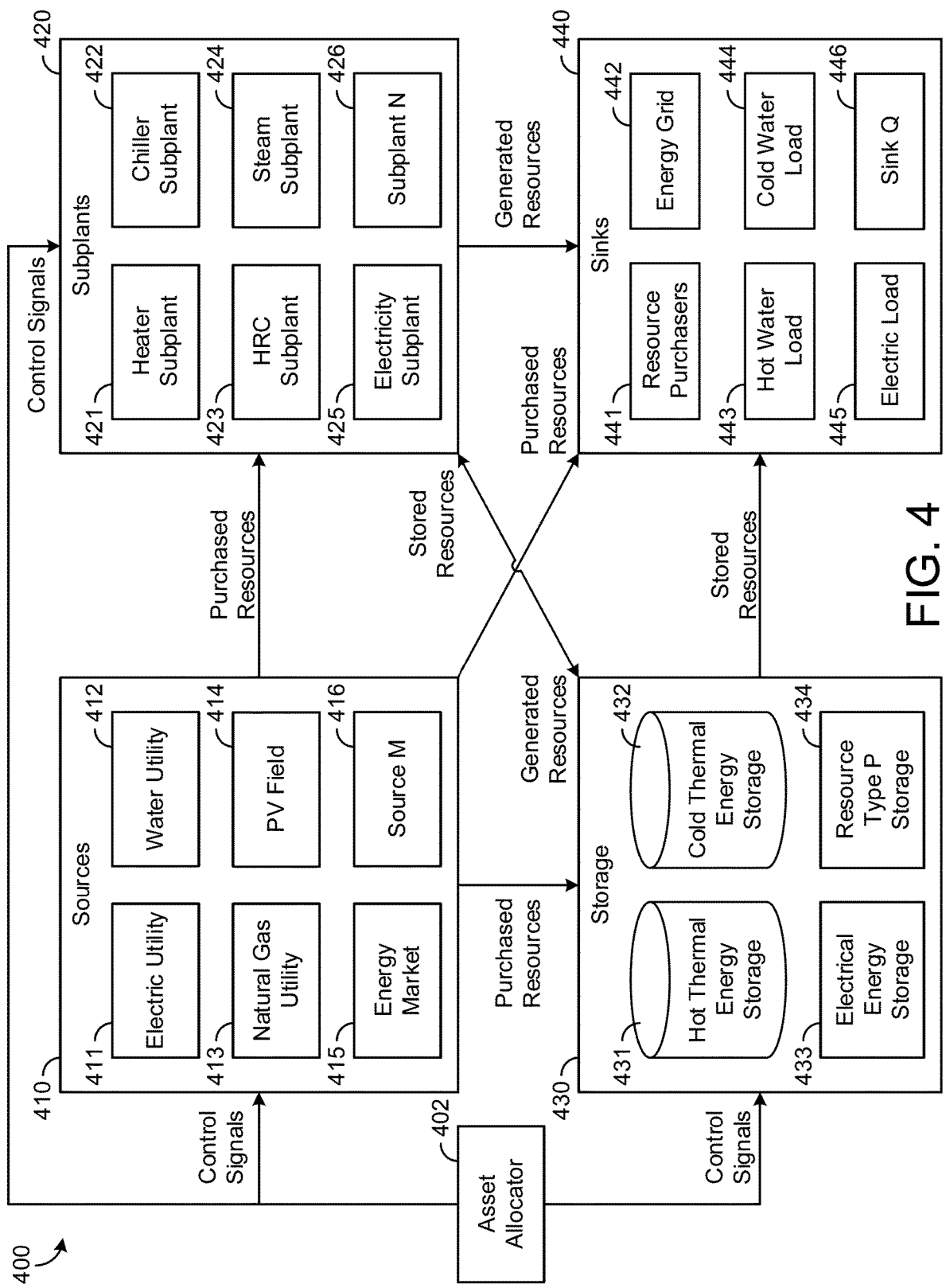
FIG. 4 is a block diagram of an asset allocation system including sources, subplants, storage, sinks, and an asset allocator configured to optimize the allocation of these assets, according to according to some embodiments.

Referring now to FIG. 4, a block diagram of an asset allocation system 400 is shown, according to an exemplary embodiment. Asset allocation system 400 can be configured to manage energy assets such as central plant equipment, battery storage, and other types of equipment configured to serve the energy loads of a building. Asset allocation system 400 can determine an optimal distribution of heating, cooling, electricity, and energy loads across different subplants (i.e., equipment groups) capable of producing that type of energy. In some embodiments, asset allocation system 400 is implemented as a component of central plant 200 and interacts with the equipment of central plant 200 in an online operational environment (e.g., performing real-time control of the central plant equipment). In other embodiments, asset allocation system 400 can be implemented as a component of a planning tool and can be configured to simulate the operation of a central plant over a predetermined time period for planning, budgeting, and/or design considerations.

Asset allocation system 400 is shown to include sources 410, subplants 420, storage 430, and sinks 440. These four categories of objects define the assets of a central plant and their interaction with the outside world. Sources 410 may include commodity markets or other suppliers from which resources such as electricity, water, natural gas, and other resources can be purchased or obtained. Sources 410 may provide resources that can be used by asset allocation system 400 to satisfy the demand of a building or campus. For example, sources 410 are shown to include an electric utility 411, a water utility 412, a natural gas utility 413, a photovoltaic (PV) field (e.g., a collection of solar panels), an energy market 415, and source M 416, where M is the total number of sources 410. Resources purchased from sources 410 can be used by subplants 420 to produce generated resources (e.g., hot water, cold water, electricity, steam, etc.), stored in storage 430 for later use, or provided directly to sinks 440.

Subplants 420 are shown to include a heater subplant 421, a chiller subplant 422, a heat recovery chiller subplant 423, a steam subplant 424, an electricity subplant 425, and subplant N, where N is the total number of subplants 420. In some embodiments, subplants 420 include some or all of the subplants of central plant 200, as described with reference to FIG. 2. For example, subplants 420 can include heater subplant 202, heat recovery chiller subplant 204, chiller subplant 206, and/or cooling tower subplant 208.

Subplants 420 can be configured to convert resource types, making it possible to balance requested loads from the building or campus using resources purchased from sources 410. For example, heater subplant 421 may be configured to generate hot thermal energy (e.g., hot water) by heating water using electricity or natural gas. Chiller subplant 422 may be configured to generate cold thermal energy (e.g., cold water) by chilling water using electricity. Heat recovery chiller subplant 423 may be configured to generate hot thermal energy and cold thermal energy by removing heat from one water supply and adding the heat to another water supply. Steam subplant 424 may be configured to generate steam by boiling water using electricity or natural gas. Electricity subplant 425 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 420 may be provided by sources 410, retrieved from storage 430, and/or generated by other subplants 420. For example, steam subplant 424 may produce steam as an output resource. Electricity subplant 425 may include a steam turbine that uses the steam generated by steam subplant 424 as an input resource to generate electricity. The output resources produced by subplants 420 may be stored in storage 430, provided to sinks 440, and/or used by other subplants 420. For example, the electricity generated by electricity subplant 425 may be stored in electrical energy storage 433, used by chiller subplant 422 to generate cold thermal energy, used to satisfy the electric load 445 of a building, or sold to resource purchasers 441.

Storage 430 can be configured to store energy or other types of resources for later use. Each type of storage within storage 430 may be configured to store a different type of resource. For example, storage 430 is shown to include hot thermal energy storage 431 (e.g., one or more hot water storage tanks), cold thermal energy storage 432 (e.g., one or more cold thermal energy storage tanks), electrical energy storage 433 (e.g., one or more batteries), and resource type P storage 434, where P is the total number of storage 430. In some embodiments, storage 430 include some or all of the storage of central plant 200, as described with reference to FIG. 2. In some embodiments, storage 430 includes the heat capacity of the building served by the central plant. The resources stored in storage 430 may be purchased directly from sources or generated by subplants 420.

In some embodiments, storage 430 is used by asset allocation system 400 to take advantage of price-based demand response (PBDR) programs. PBDR programs encourage consumers to reduce consumption when generation, transmission, and distribution costs are high. PBDR programs are typically implemented (e.g., by sources 410) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 430 allows for the resources to be purchased at times when the resources are relatively less expensive (e.g., during non-peak electricity hours) and stored for use at times when the resources are relatively more expensive (e.g., during peak electricity hours). Storing resources in storage 430 also allows the resource demand of the building or campus to be shifted in time. For example, resources can be purchased from sources 410 at times when the demand for heating or cooling is low and immediately converted into hot or cold thermal energy by subplants 420. The thermal energy can be stored in storage 430 and retrieved at times when the demand for heating or cooling is high. This allows asset allocation system 400 to smooth the resource demand of the building or campus and reduces the maximum required capacity of subplants 420. Smoothing the demand also asset allocation system 400 to reduce the peak electricity consumption, which results in a lower demand charge.

In some embodiments, storage 430 is used by asset allocation system 400 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 410 or by an independent service operator (ISO). IBDR programs supplement traditional utility-owned generation, transmission, and distribution assets with additional options for modifying demand load curves. For example, stored energy can be sold to resource purchasers 441 or an energy grid 442 to supplement the energy generated by sources 410. In some instances, incentives for participating in an IBDR program vary based on how quickly a system can respond to a request to change power output/consumption. Faster responses may be compensated at a higher level. Advantageously, electrical energy storage 433 allows system 400 to quickly respond to a request for electric power by rapidly discharging stored electrical energy to energy grid 442.

Sinks 440 may include the requested loads of a building or campus as well as other types of resource consumers. For example, sinks 440 are shown to include resource purchasers 441, an energy grid 442, a hot water load 443, a cold water load 444, an electric load 445, and sink Q, where Q is the total number of sinks 440. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 440 over the optimization period can be supplied as an input to asset allocation system 400 or predicted by asset allocation system 400. Sinks 440 can receive resources directly from sources 410, from subplants 420, and/or from storage 430.

Figure 5:
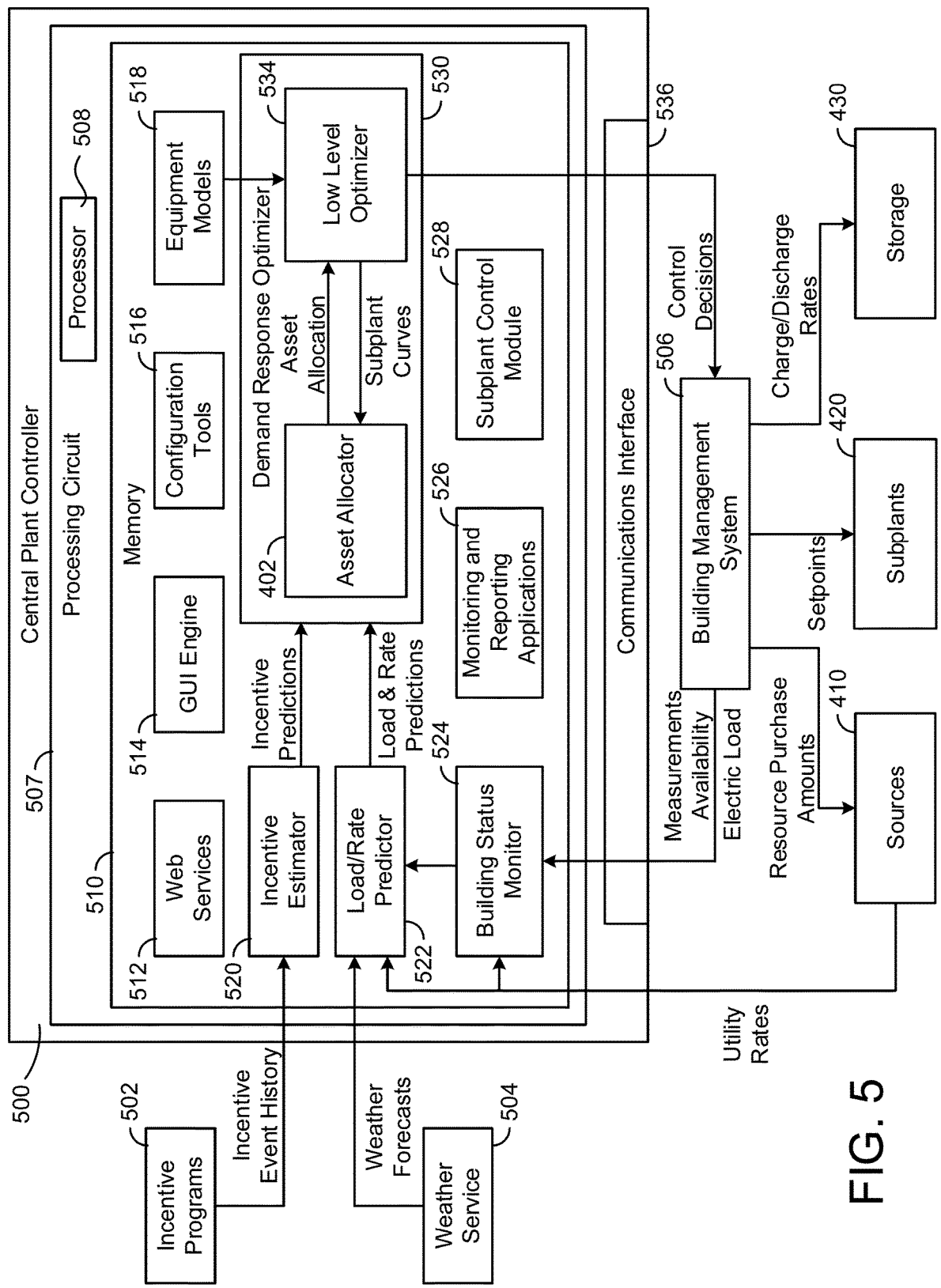
FIG. 5 is a block diagram of a central plant controller in which the asset allocator of FIG. 4 can be implemented, according to some embodiments.

Still referring to FIG. 4, asset allocation system 400 is shown to include an asset allocator 402. Asset allocator 402 can be implemented as part of a controller, computing system, cloud computing resource, etc., for example as shown in FIG. 5 and described with reference thereto. Asset allocator 402 may be configured to control the distribution, production, storage, and usage of resources in asset allocation system 400. In some embodiments, asset allocator 402 performs an optimization process to determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, the control decisions include an optimal amount of each input resource and output resource for each of subplants 420.

In some embodiments, asset allocator 402 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 410, used or produced by subplants 420, stored or discharged by storage 430, or consumed by sinks 440. For example, water may be considered a resource that is consumed by chillers, heaters, or cooling towers during operation. This general concept of a resource can be extended to chemical processing plants where one of the resources is the product that is being produced by the chemical processing plat.

Asset allocator 402 can be configured to operate the equipment of asset allocation system 400 to ensure that a resource balance is maintained at each time step of the optimization period. This resource balance is shown in the following equation:

$$\Sigma_{x_{time}} = 0 \; \forall \text{resources}, \forall \text{time} \in \text{horizon}$$

where the sum is taken over all producers and consumers of a given resource (i.e., all of sources 410, subplants 420, storage 430, and sinks 440) and time is the time index. Each time element represents a period of time during which the resource productions, requests, purchases, etc. are assumed constant. Asset allocator 402 may ensure that this equation is satisfied for all resources regardless of whether that resource is required by the building or campus. For example, some of the resources produced by subplants 420 may be intermediate resources that function only as inputs to other subplants 420.

In some embodiments, the resources balanced by asset allocator 402 include multiple resources of the same type (e.g., multiple chilled water resources, multiple electricity resources, etc.). Defining multiple resources of the same type may allow asset allocator 402 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 402 to ensure that the resource balance is satisfied for each cold water resource without attempting to allocate resources in a way that is physically impossible (e.g., storing the output of chiller A in cold water storage tank B, etc.).

Asset allocator 402 may be configured to minimize the economic cost (or maximize the economic value) of operating asset allocation system 400 over the duration of the optimization period. The economic cost may be defined by a cost function $J(x)$ that expresses economic cost as a function of the control decisions made by asset allocator 402. The cost function $J(x)$ may account for the cost of resources purchased from sources 410, as well as the revenue generated by selling resources to resource purchasers 441 or energy grid 442 or participating in incentive programs. The cost optimization performed by asset allocator 402 can be expressed as:

$$\underset{x}{\operatorname{argmin}} J(x)$$

where J(x) is defined as follows:

$$J(x) = \sum_{sources}\sum_{horizon} \text{cost}\left(purchase_{resource,time}, time\right) - \sum_{incentives}\sum_{horizon} \text{revenue}\left(ReservationAmount\right)$$

The first term in the cost function J(x) represents the total cost of all resources purchased over the optimization horizon. Resources can include, for example, water, electricity, natural gas, or other types of resources purchased from a utility or other source 410. The second term in the cost function J(x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 420 and storage 430 may include equipment that can be controlled by asset allocator 402 to optimize the performance of asset allocation system 400. Subplant equipment may include, for example, heating devices, chillers, heat recovery heat exchangers, cooling towers, energy storage devices, pumps, valves, and/or other devices of subplants 420 and storage 430. Individual devices of subplants 420 can be turned on or off to adjust the resource production of each subplant 420. In some embodiments, individual devices of subplants 420 can be operated at variable capacities (e.g., operating a chiller at 10% capacity or 60% capacity) according to an operating setpoint received from asset allocator 402. Asset allocator 402 can control the equipment of subplants 420 and storage 430 to adjust the amount of each resource purchased, consumed, and/or produced by system 400.

In some embodiments, asset allocator 402 minimizes the cost function while participating in PBDR programs, IBDR programs, or simultaneously in both PBDR and IBDR programs. For the IBDR programs, asset allocator 402 may use statistical estimates of past clearing prices, mileage ratios, and event probabilities to determine the revenue generation potential of selling stored energy to resource purchasers 441 or energy grid 442. For the PBDR programs, asset allocator 402 may use predictions of ambient conditions, facility thermal loads, and thermodynamic models of installed equipment to estimate the resource consumption of subplants 420. Asset allocator 402 may use predictions of the resource consumption to monetize the costs of running the equipment.

Asset allocator 402 may automatically determine (e.g., without human intervention) a combination of PBDR and/or IBDR programs in which to participate over the optimization horizon in order to maximize economic value. For example, asset allocator 402 may consider the revenue generation potential of IBDR programs, the cost reduction potential of PBDR programs, and the equipment maintenance/replacement costs that would result from participating in various combinations of the IBDR programs and PBDR programs. Asset allocator 402 may weigh the benefits of participation against the costs of participation to determine an optimal combination of programs in which to participate. Advantageously, this allows asset allocator 402 to determine an optimal set of control decisions that maximize the overall value of operating asset allocation system 400.

In some embodiments, asset allocator 402 optimizes the cost function J(x) subject to the following constraint, which guarantees the balance between resources purchased, produced, discharged, consumed, and requested over the optimization horizon:

$$\sum_{sources} purchase_{resource,time} + \sum_{subplants} \text{produces}\left(x_{internal,time}, x_{external,time}, v_{uncontrolled,time}\right) - \sum_{subplants} \text{consumes}\left(x_{internal,time}, x_{external,time}, v_{uncontrolled,time}\right) + \sum_{storages} discharges_{resource}(x_{internal,time}, x_{external,time}) - \sum_{sinks} requests_{resource} = 0$$

∀ resources, ∀ time ∈ horizon where $x_{internal,time}$ includes internal decision variables (e.g., load allocated to each component of asset allocation system 400), $x_{external,time}$ includes external decision variables (e.g., condenser water return temperature or other shared variables across subplants 420), and $v_{uncontrolled,time}$ includes uncontrolled variables (e.g., weather conditions).

The first term in the previous equation represents the total amount of each resource (e.g., electricity, water, natural gas, etc.) purchased from each source 410 over the optimization horizon. The second and third terms represent the total production and consumption of each resource by subplants 420 over the optimization horizon. The fourth term represents the total amount of each resource discharged from storage 430 over the optimization horizon. Positive values indicate that the resource is discharged from storage 430, whereas negative values indicate that the resource is charged or stored. The fifth term represents the total amount of each resource requested by sinks 440 over the optimization horizon. Accordingly, this constraint ensures that the total amount of each resource purchased, produced, or discharged from storage 430 is equal to the amount of each resource consumed, stored, or provided to sinks 440.

In some embodiments, additional constraints exist on the regions in which subplants 420 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant. These additional constraints can be generated and imposed by an operational domain module.

Asset allocator 402 may include a variety of features that enable the application of asset allocator 402 to nearly any central plant, central energy facility, combined heating and cooling facility, or combined heat and power facility. These features include broadly applicable definitions for subplants 420, sinks 440, storage 430, and sources 410; multiples of the same type of subplant 420 or sink 440; subplant resource connections that describe which subplants 420 can send resources to which sinks 440 and at what efficiency; subplant minimum turndown into the asset allocation optimization; treating electrical energy as any other resource that must be balanced; constraints that can be commissioned during run-time; different levels of accuracy at different points in the horizon; setpoints (or other decisions) that are shared between multiple subplants included in the decision vector;

disjoint subplant operation regions; incentive based electrical energy programs; and high level airside models. Incorporation of these features may allow asset allocator 402 to support a majority of the central energy facilities that will be seen in the future. Additionally, it will be possible to rapidly adapt to the inclusion of new subplant types. Some of these features are described in greater detail below.

Broadly applicable definitions for subplants 420, sinks 440, storage 430, and sources 410 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 420 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 400 rather than needing them hard coded. Of course, "typed" resources and other components of system 400 can still exist in order to generate the mapping at run time, based on equipment out of service.

Incorporating multiple subplants 420 or sinks 440 of the same type allows for modeling the interconnections between subplants 420, sources 410, storage 430, and sinks 440. This type of modeling describes which subplants 420 can use resource from which sources 410 and which subplants 420 can send resources to which sinks 440. This can be visualized as a resource connection matrix (i.e., a directed graph) between the subplants 420, sources 410, sinks 440, and storage 430. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 420 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incentive programs often require the reservation of one or more assets for a period of time. In traditional systems, these assets are typically turned over to alternative control, different than the typical resource price based optimization. Advantageously, asset allocator 402 can be configured to add revenue to the cost function per amount of resource reserved. Asset allocator 402 can then make the reserved portion of the resource unavailable for typical price based cost optimization. For example, asset allocator 402 can reserve a portion of a battery asset for frequency response. In this case, the battery can be used to move the load or shave the peak demand, but can also be reserved to participate in the frequency response program.

Central Plant Controller

Referring now to FIG. 5, a block diagram of a central plant controller 500 in which asset allocator 402 can be implemented is shown, according to an exemplary embodiment. In various embodiments, central plant controller 500 can be configured to monitor and control central plant 200, asset allocation system 400, and various components thereof (e.g., sources 410, subplants 420, storage 430, sinks 440, etc.). Central plant controller 500 is shown providing control decisions to a building management system (BMS) 506. The control decisions provided to BMS 506 may include resource purchase amounts for sources 410, setpoints for subplants 420, and/or charge/discharge rates for storage 430. In other embodiments, the central plant controller is configured in a planning tool implementation in which an operation of the central plant is planned over an optimization period (e.g., 1 year) for use in planning, operational decision-making, budgeting, planning for purchase of new assets, etc.

In some embodiments, BMS 506 is the same or similar to the BMS described with reference to FIG. 1. BMS 506 may be configured to monitor conditions within a controlled building or building zone. For example, BMS 506 may receive input from various sensors (e.g., temperature sensors, humidity sensors, airflow sensors, voltage sensors, etc.) distributed throughout the building and may report building conditions to central plant controller 500. Building conditions may include, for example, a temperature of the building or a zone of the building, a power consumption (e.g., electric load) of the building, a state of one or more actuators configured to affect a controlled state within the building, or other types of information relating to the controlled building. BMS 506 may operate subplants 420 and storage 430 to affect the monitored conditions within the building and to serve the thermal energy loads of the building.

BMS 506 may receive control signals from central plant controller 500 specifying on/off states, charge/discharge rates, and/or setpoints for the subplant equipment. BMS 506 may control the equipment (e.g., via actuators, power relays, etc.) in accordance with the control signals provided by central plant controller 500. For example, BMS 506 may operate the equipment using closed loop control to achieve the setpoints specified by central plant controller 500. In various embodiments, BMS 506 may be combined with central plant controller 500 or may be part of a separate building management system. According to an exemplary embodiment, BMS 506 is a METASYS® brand building management system, as sold by Johnson Controls, Inc.

Central plant controller 500 may monitor the status of the controlled building using information received from BMS 506. Central plant controller 500 may be configured to predict the thermal energy loads (e.g., heating loads, cooling loads, etc.) of the building for plurality of time steps in an optimization period (e.g., using weather forecasts from a weather service 504). Central plant controller 500 may also predict the revenue generation potential of incentive based demand response (IBDR) programs using an incentive event history (e.g., past clearing prices, mileage ratios, event probabilities, etc.) from incentive programs 502. Central plant controller 500 may generate control decisions that optimize the economic value of operating central plant 200 over the duration of the optimization period subject to constraints on the optimization process (e.g., energy balance constraints, load satisfaction constraints, etc.). The optimization process performed by central plant controller 500 is described in greater detail below.

In some embodiments, central plant controller 500 is integrated within a single computer (e.g., one server, one housing, etc.). In various other exemplary embodiments, central plant controller 500 can be distributed across multiple servers or computers (e.g., that can exist in distributed locations). In another exemplary embodiment, central plant controller 500 may integrated with a smart building manager that manages multiple building systems and/or combined with BMS 506.

Central plant controller 500 is shown to include a communications interface 536 and a processing circuit 507. Communications interface 536 may include wired or wireless interfaces (e.g., jacks, antennas, transmitters, receivers, transceivers, wire terminals, etc.) for conducting data communications with various systems, devices, or networks. For example, communications interface 536 may include an Ethernet card and port for sending and receiving data via an Ethernet-based communications network and/or a WiFi transceiver for communicating via a wireless communications network. Communications interface 536 may be configured to communicate via local area networks or wide area networks (e.g., the Internet, a building WAN, etc.) and may use a variety of communications protocols (e.g., BACnet, IP, LON, etc.).

Communications interface 536 may be a network interface configured to facilitate electronic data communications between central plant controller 500 and various external systems or devices (e.g., BMS 506, subplants 420, storage 430, sources 410, etc.). For example, central plant controller 500 may receive information from BMS 506 indicating one or more measured states of the controlled building (e.g., temperature, humidity, electric loads, etc.) and one or more states of subplants 420 and/or storage 430 (e.g., equipment status, power consumption, equipment availability, etc.). Communications interface 536 may receive inputs from BMS 506, subplants 420, and/or storage 430 and may provide operating parameters (e.g., on/off decisions, setpoints, etc.) to subplants 420 and storage 430 via BMS 506. The operating parameters may cause subplants 420 and storage 430 to activate, deactivate, or adjust a setpoint for various devices thereof.

Still referring to FIG. 5, processing circuit 507 is shown to include a processor 508 and memory 510. Processor 508 may be a general purpose or specific purpose processor, an application specific integrated circuit (ASIC), one or more field programmable gate arrays (FPGAs), a group of processing components, or other suitable processing components. Processor 508 may be configured to execute computer code or instructions stored in memory 510 or received from other computer readable media (e.g., CDROM, network storage, a remote server, etc.).

Memory 510 may include one or more devices (e.g., memory units, memory devices, storage devices, etc.) for storing data and/or computer code for completing and/or facilitating the various processes described in the present disclosure. Memory 510 may include random access memory (RAM), read-only memory (ROM), hard drive storage, temporary storage, non-volatile memory, flash memory, optical memory, or any other suitable memory for storing software objects and/or computer instructions. Memory 510 may include database components, object code components, script components, or any other type of information structure for supporting the various activities and information structures described in the present disclosure. Memory 510 may be communicably connected to processor 508 via processing circuit 507 and may include computer code for executing (e.g., by processor 508) one or more processes described herein.

Memory 510 is shown to include a building status monitor 524. Central plant controller 500 may receive data regarding the overall building or building space to be heated or cooled by system 400 via building status monitor 524. In an exemplary embodiment, building status monitor 524 may include a graphical user interface component configured to provide graphical user interfaces to a user for selecting building requirements (e.g., overall temperature parameters, selecting schedules for the building, selecting different temperature levels for different building zones, etc.).

Central plant controller 500 may determine on/off configurations and operating setpoints to satisfy the building requirements received from building status monitor 524. In some embodiments, building status monitor 524 receives, collects, stores, and/or transmits cooling load requirements, building temperature setpoints, occupancy data, weather data, energy data, schedule data, and other building parameters. In some embodiments, building status monitor 524 stores data regarding energy costs, such as pricing information available from sources 410 (energy charge, demand charge, etc.).

Still referring to FIG. 5, memory 510 is shown to include a load/rate predictor 522. Load/rate predictor 522 may be configured to predict the thermal energy loads ($\hat{\ell}_k$) of the building or campus for each time step k (e.g., k=1 . . . n) of an optimization period. Load/rate predictor 522 is shown receiving weather forecasts from a weather service 504. In some embodiments, load/rate predictor 522 predicts the thermal energy loads $\hat{\ell}_k$ as a function of the weather forecasts. In some embodiments, load/rate predictor 522 uses feedback from BMS 506 to predict loads $\hat{\ell}_k$. Feedback from BMS 506 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 522 receives a measured electric load and/or previous measured load data from BMS 506 (e.g., via building status monitor 524). Load/rate predictor 522 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, day, t | Y_{k-1})$$

In some embodiments, load/rate predictor 522 uses a deterministic plus stochastic model trained from historical load data to predict loads $\hat{\ell}_k$. Load/rate predictor 522 may use any of a variety of prediction methods to predict loads $\hat{\ell}_k$ (e.g., linear regression for the deterministic portion and an AR model for the stochastic portion). Load/rate predictor 522 may predict one or more different types of loads for the building or campus. For example, load/rate predictor 522 may predict a hot water load $\hat{\ell}_{Hot,k}$ and a cold water load $\hat{\ell}_{Cold,k}$ for each time step k within the prediction window. In some embodiments, load/rate predictor 522 makes load/rate predictions using the techniques described in U.S. patent application Ser. No. 14/717,593, filed May 20, 2015, which is incorporated by reference herein in its entirety.

Load/rate predictor 522 is shown receiving utility rates from sources 410. Utility rates may indicate a cost or price per unit of a resource (e.g., electricity, natural gas, water, etc.) provided by sources 410 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from sources 410 or predicted utility rates estimated by load/rate predictor 522.

In some embodiments, the utility rates include demand charges for one or more resources provided by sources 410. A demand charge may define a separate cost imposed by sources 410 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 530 may be configured to account for demand charges in the high level optimization process performed by asset allocator 402. Sources 410 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 522 may store the predicted loads $\hat{\ell}_k$ and the utility rates in memory 510 and/or provide the predicted loads $\hat{\ell}_k$ and the utility rates to demand response optimizer 530.

Still referring to FIG. 5, memory 510 is shown to include an incentive estimator 520. Incentive estimator 520 may be configured to estimate the revenue generation potential of participating in various incentive-based demand response (IBDR) programs. In some embodiments, incentive estimator 520 receives an incentive event history from incentive programs 502. The incentive event history may include a history of past IBDR events from incentive programs 502. An IBDR event may include an invitation from incentive programs 502 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 520 may use the incentive event history to estimate IBDR event probabilities during the optimization period.

Incentive estimator 520 is shown providing incentive predictions to demand response optimizer 530. The incentive predictions may include the estimated IBDR probabilities, estimated participation requirements, an estimated amount of revenue from participating in the estimated IBDR events, and/or any other attributes of the predicted IBDR events. Demand response optimizer 530 may use the incentive predictions along with the predicted loads $\hat{\ell}_k$ and utility rates from load/rate predictor 522 to determine an optimal set of control decisions for each time step within the optimization period.

Still referring to FIG. 5, memory 510 is shown to include a demand response optimizer 530. Demand response optimizer 530 may perform a cascaded optimization process to optimize the performance of asset allocation system 400. For example, demand response optimizer 530 is shown to include asset allocator 402 and a low level optimizer 534. Asset allocator 402 may control an outer (e.g., subplant level) loop of the cascaded optimization. Asset allocator 402 may determine an optimal set of control decisions for each time step in the prediction window in order to optimize (e.g., maximize) the value of operating asset allocation system 400. Control decisions made by asset allocator 402 may include, for example, load setpoints for each of subplants 420, charge/discharge rates for each of storage 430, resource purchase amounts for each type of resource purchased from sources 410, and/or an amount of each resource sold to energy purchasers 504. In other words, the control decisions may define resource allocation at each time step. The control decisions made by asset allocator 402 are based on the statistical estimates of incentive event probabilities and revenue generation potential for various IBDR events as well as the load and rate predictions.

Low level optimizer 534 may control an inner (e.g., equipment level) loop of the cascaded optimization. Low level optimizer 534 may determine how to best run each subplant at the load setpoint determined by asset allocator 402. For example, low level optimizer 534 may determine on/off states and/or operating setpoints for various devices of the subplant equipment in order to optimize (e.g., minimize) the energy consumption of each subplant while meeting the resource allocation setpoint for the subplant. In some embodiments, low level optimizer 534 receives actual incentive events from incentive programs 502. Low level optimizer 534 may determine whether to participate in the incentive events based on the resource allocation set by asset allocator 402. For example, if insufficient resources have been allocated to a particular IBDR program by asset allocator 402 or if the allocated resources have already been used, low level optimizer 534 may determine that asset allocation system 400 will not participate in the IBDR program and may ignore the IBDR event. However, if the required resources have been allocated to the IBDR program and are available in storage 430, low level optimizer 534 may determine that system 400 will participate in the IBDR program in response to the IBDR event. The cascaded optimization process performed by demand response optimizer 530 is described in greater detail in U.S. patent application Ser. No. 15/247,885, filed Aug. 25, 2016, which is incorporated by reference herein in its entirety.

In some embodiments, low level optimizer 534 generates and provides subplant curves to asset allocator 402. Each subplant curve may indicate an amount of resource consumption by a particular subplant (e.g., electricity use measured in kW, water use measured in L/s, etc.) as a function of the subplant load. In some embodiments, low level optimizer 534 generates the subplant curves by running the low level optimization process for various combinations of subplant loads and weather conditions to generate multiple data points. Low level optimizer 534 may fit a curve to the data points to generate the subplant curves. In other embodiments, low level optimizer 534 provides the data points asset allocator 402 and asset allocator 402 generates the subplant curves using the data points. Asset allocator 402 may store the subplant curves in memory for use in the high level (i.e., asset allocation) optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 518. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Still referring to FIG. 5, memory 510 is shown to include a subplant control module 528. Subplant control module 528 may store historical data regarding past operating statuses, past operating setpoints, and instructions for calculating and/or implementing control parameters for subplants 420 and storage 430. Subplant control module 528 may also receive, store, and/or transmit data regarding the conditions of individual devices of the subplant equipment, such as operating efficiency, equipment degradation, a date since last service, a lifespan parameter, a condition grade, or other device-specific data. Subplant control module 528 may receive data from subplants 420, storage 430, and/or BMS 506 via communications interface 536. Subplant control module 528 may also receive and store on/off statuses and operating setpoints from low level optimizer 534.

Data and processing results from demand response optimizer 530, subplant control module 528, or other modules of central plant controller 500 may be accessed by (or pushed to) monitoring and reporting applications 526. Monitoring and reporting applications 526 may be configured to generate real time "system health" dashboards that can be viewed and navigated by a user (e.g., a system engineer). For example, monitoring and reporting applications 526 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 5, central plant controller 500 may include one or more GUI servers, web services 512, or GUI engines 514 to support monitoring and reporting applications 526. In various embodiments, applications 526, web services 512, and GUI engine 514 may be provided as separate components outside of central plant controller 500 (e.g., as part of a smart building manager). Central plant controller 500 may be configured to maintain detailed historical databases (e.g., relational databases, XML, databases, etc.) of relevant data and includes computer code modules that continuously, frequently, or infrequently query, aggregate, transform, search, or otherwise process the data maintained in the detailed databases. Central plant controller 500 may be configured to provide the results of any such processing to other databases, tables, XML files, or other data structures for further querying, calculation, or access by, for example, external monitoring and reporting applications.

Central plant controller 500 is shown to include configuration tools 516. Configuration tools 516 can allow a user to define (e.g., via graphical user interfaces, via prompt-driven "wizards," etc.) how central plant controller 500 should react to changing conditions in the energy storage subsystems. In an exemplary embodiment, configuration tools 516 allow a user to build and store condition-response scenarios that can cross multiple energy storage system devices, multiple building systems, and multiple enterprise control applications (e.g., work order management system applications, entity resource planning applications, etc.). For example, configuration tools 516 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 516 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Various other implementations of the cost functions, optimization processes, controllers, etc. described above are also possible. For example, the systems and methods described herein may be implemented with any combination of the various features described in U.S. patent application Ser. No. 15/405,236, filed Jan. 12, 2017; U.S. patent application Ser. No. 15/405,234, filed Jan. 12, 2017; U.S. patent application Ser. No. 15/429,962, filed Feb. 7, 2017; U.S. patent application Ser. No. 15/473,496, filed Mar. 29, 2017; U.S. patent application Ser. No. 15/616,616, filed Jun. 7, 2017; and U.S. patent application Ser. No. 16/115,290, filed Aug. 28, 2018. These applications are incorporated by reference herein in their entireties.

Low Level Optimizer

Figure 6:
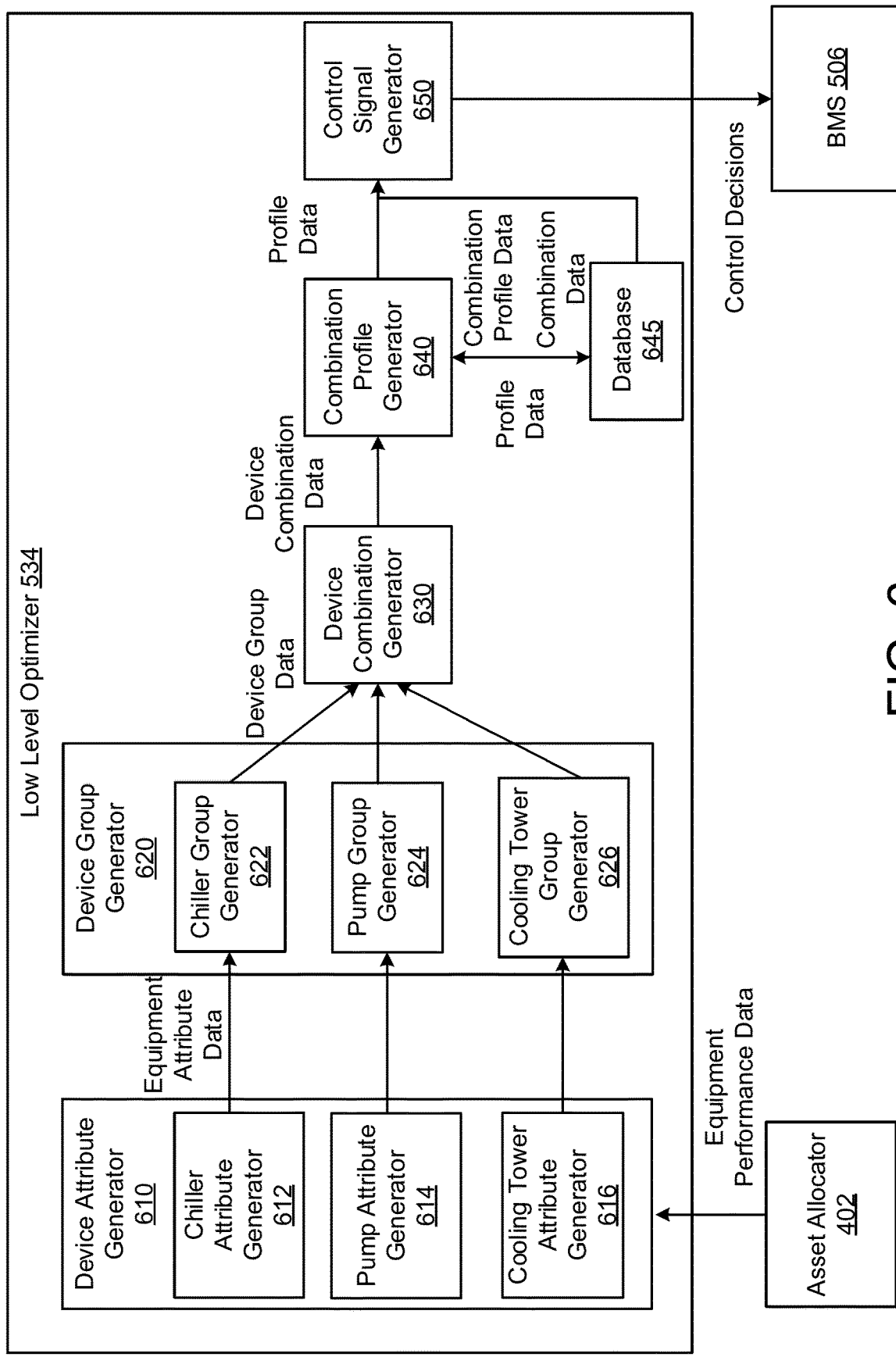
FIG. 6 is a block diagram of a low level optimizer of the central plant controller of FIG. 5, according to some embodiments.

Referring now to FIG. 6, a block diagram of the low level optimizer 534 is shown, according to an exemplary embodiment. As discussed above, the low level optimizer 534 may determine how to best run each subplant at the load setpoint determined by the asset allocator 402. In this regard, the low level optimizer 534 may determine on/off states and/or operative setpoints for various devices of the subplant equipment to optimize (e.g., minimize) the energy consumption of each subplant. In an exemplary embodiment, the low level optimizer 534 is also configured to determine on/off states and/or operative setpoints in order to minimize the economic cost (or maximize the economic value) of operating the asset allocation system 400 and/or the BMS 506, as determined by the asset allocator 402. In this regard, the low level optimizer 534 may receive data associated with a cost function, optimize various data sets, and/or issue control decisions to the asset allocation system 400 and/or the BMS 506 to control devices of the subplants 420 in order to minimize (or maximize) the value of the cost function, as discussed below.

Referring to the low level optimizer 534 generally, the low level optimizer 534 is configured to receive equipment performance data associated with one or more devices from the asset allocator 402. The equipment performance data may characterize the operating performance of the one or more devices based on configurations provided from the asset allocator 402 that minimize (or maximize) the value of a cost function. In this regard, the equipment performance data may be derived from and/or related to a cost function (or cost functions), and/or associated with the asset allocation data of the demand response optimizer 530. For example, the equipment performance data may be derived from the cost function J(f), which expresses the economic cost as a function of equipment performance models and/or device parameters of one or more devices. In some embodiments, the equipment performance data is derived from the cost function J(x), which expresses economic cost as a function of the control decisions made by asset allocator 402. The cost functions J(f) and/or J(x) may account for, and the equipment performance data may relate to, load setpoints for each of subplants 420, charge/discharge rates for each of storage 430, resource purchase amounts for each type of resource purchase from sources 410, the amount of each resource sold to energy purchasers 504, and/or other information relating to the costs/performance of the asset allocation system 400 and/or the BMS 506. While the cost function described herein is described as the cost function J(f), it is understood that any other type of cost function (e.g., J(x), etc.) can be used in place of, or in addition to, the cost function J(f).

In some embodiments, the equipment performance data also includes a list of possible device profiles (e.g., active, inactive, on/off, binary, analog, operative setpoints, etc.) of one or more devices (e.g., heating devices, chillers, heat recovery heat exchangers, cooling towers, energy storage devices, pumps, valves, and/or other devices of subplants 420). In other embodiments, the equipment performance data also includes a list of possible device combinations (e.g., groups of devices, number of devices, types of devices, etc.) associated with the cost function J(f). In an exemplary embodiment, the low level optimizer 534 is configured to optimize the equipment performance data and issue control decisions in order to minimize (or maximize) the value of the cost function J(f). For example, the low level optimizer 534 may be configured to prune the equipment performance data to remove branches of the data set where the low level optimizer 534 determines proceeding further will result in an infeasible combination of device control decisions. In addition, the low level optimizer 534 may be configured to seed the equipment performance data, or exclude data sets that do not contain a predetermined device profile (e.g., on/off, binary, etc.). In this regard, the optimization techniques (e.g., searching, pruning, seeding, etc.) of the low level optimizer advantageously permit the low level optimizer 534 to more efficiently issue control decisions in order to minimize (or maximize) a value of the cost function J(f). Various implementations of other optimization techniques are described in U.S. patent application Ser. No. 14/634,615, filed Feb. 27, 2015, now U.S. Pat. No. 10,101,731, which is incorporated by reference herein in its entirety.

As shown in FIG. 6, the low level optimizer 534 includes a device attribute generator 610, a device group generator 620, a device combination generator 630, a combination profile generator 640, a database 645, and a control signal generator 650. The components of the low level optimizer 534 may be configured to receive equipment performance data from the asset allocator 402, and optimize the data to more efficiently determine how to best run components of the asset allocation system 400 (and/or the BMS 506) in order to achieve a minimum (or maximum) value of the cost function J(f). More specifically, the components of the low level optimizer 534 may categorize similar devices into one or more groups based on device attributes, eliminate and/or remove redundant combination profiles from the group or groups, and/or operate the devices (or groups of devices) in accordance with control decisions that achieve a minimum (or maximum) value of the cost function J(f), as discussed below.

As shown in FIG. 6, the device attribute generator 610 includes a chiller attribute generator 612, a pump attribute generator 614, and a cooling tower attribute generator 616, and is shown to receive equipment performance data from the asset allocator 402. As discussed above, the equipment performance data may characterize the operating performance of one or more devices and/or may be derived from the cost function J(f) (e.g., include load setpoints, charge/discharge rates, resource purchase amounts, amounts of each resource sold, and/or other information relating to optimal cost and/or performance). In an exemplary embodiment, the components of the device attribute generator 610 (e.g., attribute generators 612-616) receive equipment performance data associated with related types of devices. For example, the chiller attribute generator 612 may receive equipment performance data relating to chillers, the pump attribute generator 614 may receive equipment performance data relating to pumps, the cooling tower attribute generator 616 may receive equipment performance data relating to chiller towers, etc. While the device attribute generator 610 is shown to include attribute generators 612-616, it is understood that any other type of device attribute generators may be used in place of, or in addition to, the attribute generators 612-616 (e.g., heating device attribute generator, heat recovery heat exchanger attribute generator, energy storage device attribute generator, valve attribute generator, and/or other attribute generators for other devices of subplants 420). It is appreciated that the specific types of device attribute generators included within device attribute generator 610 may vary depending on the types of equipment within the plant (e.g., a device attribute generator for each type of equipment).

The device attribute generator 610 may also be configured to generate equipment attribute data associated with one or more devices based on the equipment performance data. The equipment attribute data may relate to one or more characteristics of a device, as discussed below. Further, the equipment attribute data may also be derived from and/or relate to the cost function J(f). In this regard, the cost function J(f) may incorporate the equipment attribute data and/or portions of the equipment attribute data may be used by the asset allocator 402 in determining a minimum (or maximum) value of the cost function J(f). While the equipment attribute data is described herein as being based on equipment performance data, it is understood that any other type of data can be used in place of, or in addition to, equipment performance data (e.g., equipment models provided by a device manufacturer or generated based on the equipment performance data, device attributes such as maximum and minimum capacities, power requirements, flow rates, charge/discharge rates, data derived from a cost function, data from the asset allocation system 400, the BMS 506, etc.).

In an exemplary embodiment, the equipment attribute data includes one or more model characteristics derived from an equipment performance model. In some embodiments, the equipment performance model includes standard model characteristics that relate the cost and/or performance (e.g., thermal, mechanical, etc.) of a device to the properties of the device (e.g., physical, thermodynamic, etc.). For example, the model characteristics may be equipment coefficients, regressions coefficients, etc. In other embodiments, the equipment performance model includes a set of trainable model characteristics that are generated by fitting the equipment performance model to a set of training data. For example, the model characteristics may be trainable model coefficients, trainable model regression coefficients, etc. In an exemplary embodiment, the components of the device attribute generator 610 (e.g., attribute generators 612-616) are configured to provide equipment attribute data based on equipment performance models associated with related types of devices (e.g., chillers, pumps, cooling towers, etc.).

For example, the chiller attribute generator 612 may provide equipment attribute data associated with a chiller based on the Gordon and Ng chiller model shown in the following equation:

$$\left(\frac{power}{qEvap}+1\right)\frac{CHWTOut}{CWTOut}-1=$$

$$c_1\frac{CHWTOut}{qEvap}+c_2\frac{(CWTOut-CHWTOut)}{CWTOut*qEvap}+c_3\frac{\left(\frac{power}{qEvap}+1\right)qEvap}{CWTOut}$$

In addition, the pump attribute generator 614 may provide equipment attribute data associated with a pump based on the pump model shown in the following equation:

$$\Delta\hat{P} = coeff_1 \cdot cmd_{speed}^2 \cdot des_{\Delta P}\left[1-\left(\frac{flow}{coeff_2 \cdot cmd_{speed} \cdot des_{flow}}\right)^{coeff_3}\right]$$

Further, the cooling tower attribute generator 616 may provide equipment attribute data associated with heat exchangers of the cooling tower based on the model shown in the following equations:

$$\frac{desUA}{Fixed + \frac{c4}{WFract_A^{c5}} + \frac{c4}{WFract_B^{c6}}}$$

where:

$$Fixed = \frac{c1}{c2*[\max(1, WFract_A - c3)]^2 + c2*[\max(1, WFract_B - c3)]^2}$$

$$WFract_A = \frac{flowA}{desFlowA}$$

$$WFract_B = \frac{flowB}{desFlowB}$$

In some embodiments, the equipment attribute data is provided based on other equipment models that relate the performance (e.g., thermal, mechanical, electrical, hydraulic, etc.), cost, characteristics, etc. of a device to other properties of the device (e.g., physical, thermodynamic, hydraulic, etc.).

Also in an exemplary embodiment, the equipment attribute data includes one or more device parameters (e.g., characteristics, etc.). For example, the device parameters may include the minimum and/or maximum energy of a device, the minimum and/or maximum power of a device, the minimum and/or maximum flow rate of a device, the minimum and/or maximum temperature of a device, the minimum and/or maximum pressure of a device, and/or any other suitable characteristic and/or measurement of a device. The device parameters may include any type of device specifications that define the operating performance, operating limits, required inputs/outputs, or any other operating characteristic that could be used to determine whether the devices are functionally similar or equivalent.

As shown in FIG. 6, the device group generator 620 includes the chiller group generator 622, the pump group generator 624, and the cooling tower group generator 626, and is shown to receive equipment attribute data relating to one or more devices. The components of the device group generator 620 (e.g., group generators 622-626) may receive equipment attribute data associated with related types of devices (e.g., chillers, pumps, cooling towers, etc.). Although only three examples of device group generators 622-622 are shown in FIG. 6, it is appreciated that the specific types of device group generators included within device group generator 620 may vary depending on the types of equipment within the plant (e.g., a device group generator for each type of equipment). According to an exemplary embodiment, the components of the device group generator 620 are also configured to categorize one or more devices into a group or groups. More specifically, the device group generator 620 may categorize devices based on whether the devices are similar. Given that similar devices tend to be similar in operation and cost, categorizing devices based on whether devices are similar allows the low level optimizer 534 to efficiently filter different device combinations and/or operate the devices (or groups of devices) in accordance with control decisions that achieve a minimum (or maximum) value of the cost function J(f), as will be discussed below.

Throughout this disclosure, the term "similar" is used to describe devices that have comparable corresponding equipment attribute data. Two or more devices may be considered "similar" to each other if their equipment attribute data meet predefined similarity criteria such as having corresponding equipment model coefficients or other equipment attributes that are within a predetermined threshold of each other (e.g. within 1% error, within 2% error, within 5% error, within 10% error, or any other predefined error percentage threshold) when comparing the equipment attribute data of one device with the corresponding equipment attribute data of another device. Percent error can be calculated using standard techniques such as $$\frac{|c_1 - c_2|}{c_1}$$

where $c_1$ is the value of a particular equipment attribute of device 1 and $c_2$ is the value of the corresponding equipment attribute of device 2. In some embodiments, a plurality of devices are similar if the errors between one or more of the corresponding equipment attribute data of the devices are within a predetermined threshold. In some embodiments, a plurality of devices are similar if a predetermined amount (e.g., 25%, 50%, 75%, etc.) or all the errors between the corresponding equipment attribute data of the devices are within a predetermined threshold. In some embodiments, a plurality of devices are similar if the average or aggregate difference (e.g., percent error or subtraction) between corresponding equipment attribute data of the devices is within a predetermined threshold. In some embodiments, devices are similar if the sums of all the differences between corresponding attributes of the equipment attribute data of the devices is within a predetermined threshold.

While several examples of how "similar" devices can be determined objectively by comparing the equipment attribute data are described herein, it is contemplated that any type of comparison could be used without departing from the teachings of the present disclosure. For example, it is contemplated that the device group generator 620 could use any of a variety of clustering algorithms such as connectivity-based clustering (hierarchical clustering), centroid-based clustering, distribution-based clustering, density-based clustering, grid-based clustering, or any other univariate or multivariate clustering techniques to determine whether two or more devices are similar by applying such techniques to the equipment attribute data.

As an illustrative example, components of the device group generator 620 (e.g., group generators 622-626) may receive equipment attribute data of a plurality of devices, which includes characteristics derived from equipment performance models. As discussed above, the equipment attribute data may relate the performance of a device to the properties of that device and/or training data (e.g., in the form of coefficients, regression coefficients, model coefficients, model regression coefficients, etc.). For example, the chiller group generator 622 may receive equipment attribute data (e.g., coefficient data) of a plurality of chillers derived from the Gordon and Ng chiller model shown below:

$$\left(\frac{power}{qEvap}+1\right)\frac{CHWTOut}{CWTOut}-1=$$
$$c_1\frac{CHWTOut}{qEvap}+c_2\frac{(CWTOut-CHWTOut)}{CWTOut*qEvap}+c_3\frac{\left(\frac{power}{qEvap}+1\right)qEvap}{CWTOut}$$

The chiller group generator 622 may compare the coefficients (e.g., $c_1$, $c_2$, $c_3$) of the Gordon and Ng models of the chillers, and determine whether the chillers are similar. For example, if some or all the errors between the coefficients of the devices are within a predetermined threshold, or if the difference between the sums of the coefficients of the devices is within a predetermined threshold, the chiller group generator 622 may determine the devices are similar.

In addition, the pump group generator 624 may receive equipment attribute data (e.g., coefficient data) of a plurality of pumps derived from the pump model shown below:

$$\Delta\hat{P}=coeff_1 \cdot cmd_{speed}^2 \cdot des_{\Delta P}\left[1-\left(\frac{flow}{coeff_2 \cdot cmd_{speed} \cdot des_{flow}}\right)^{coeff_3}\right]$$

The pump group generator 624 may compare the coefficients (e.g., $coeff_1$, $coeff_2$, $coeff_3$) of the pump models of the pumps, and determine whether the pumps are similar.

Further, cooling tower group generator 626 may receive equipment attribute data (e.g., coefficient data) of heat exchangers of a plurality of cooling towers based on the model shown in the equations below:

$$\text{Fixed}+\frac{desUA}{\frac{c4}{WFract_A^{c5}}+\frac{c4}{WFract_B^{c6}}}$$

where:

$$\text{Fixed}=\frac{c1}{c2*[\max(1,WFract_A-c3)]^2+c2*[\max(1,WFract_B-c3)]^2}$$

$$WFract_A=\frac{flowA}{desFlowA}$$

-continued $$WFract_B=\frac{flowB}{desFlowB}$$

The cooling tower group generator 626 may compare the coefficients of the heat exchanger models of the plurality of cooling towers (e.g., $c_1$, $c_2$, $c_3$, $c_4$, $c_5$, $c_6$), and determine whether the cooling towers are similar.

As another illustrative example, the components of the device group generator 620 (e.g., group generators 622-626) may receive equipment attribute data of a plurality of devices, which includes one or more device parameters. As discussed above, the device parameters may include minimum and/or maximum energy, minimum and/or maximum power, minimum and/or maximum flow rate, minimum and/or maximum temperature, the minimum and/or maximum pressure, etc. The components of the device group generator 620 (e.g., the group generators 622-226) may compare the device parameters of related devices, and determine whether the devices are similar. For example, if some or all the errors between the device parameters of the devices are within a predetermined threshold, or if the difference between the sums of the device parameters of the devices is within a predetermined threshold, the device group generator 620 (e.g., the group generators 622-226) may determine the devices are similar.

The device group generator 620 (and the group generators 622-626) is/are also configured to categorize devices into one or more groups. If the device group generator 620 determines a plurality of devices are similar, the device group generator 620 may categorize the devices in a device group. Conversely, if the device group generator 620 determines the devices are not similar, the device group generator 620 may categorize the devices in different device groups. The device group generator 620 may categorize a given device into an existing group if the device is determined to be similar to one or more devices already categorized into that group or to that group as a whole (e.g., similar to an average of the devices within that group). The device group generator 620 may create a new group for the device if the device is not determined to be similar to one or more devices within any of the existing groups or to any of the existing groups as a whole. This categorization into one or more device groups may be stored in the device group generator 620, and/or other components of the low level optimizer 534 (e.g., a database, etc.) for further analysis and/or processing. For example, the device group generator 620 may receive additional equipment attribute data associated with another device, compare the equipment attribute data to devices stored in an existing device group or groups, determine whether the device is similar to devices stored in the existing group or groups, and categorize the device in a similar group or another group based on the determination. This process may be repeated until the device group generator 620 no longer receives additional equipment attribute data (e.g., an iterative or repetitive process) and has assigned each of the devices to a corresponding device group.

In some embodiments, the device group generator 620 also receives and/or compiles data from the group generators 622-626 in the form of device group data. The device group data may include, for example, combinations of device groups (e.g., number of groups, number of devices in groups, types of devices in groups, etc.), device profiles in a device group or groups (active, inactive, on/off, analog, binary, etc.), equipment attribute data associated with a device group (e.g., equipment model characteristics, device parameters, etc.), and/or any other suitable device data. The device group generator 620 and/or components of the low level optimizer 534 (e.g., a database, etc.) may store the device group data for further analysis and/or processing. Further, the device group generator 620 may also provide the device group data to other components of the low level optimizer 534.

As shown in FIG. 6, the device combination generator 630 is configured to receive device group data. The device group data may include, for example, each of the device groups generated by device group generator 620 and may indicate which of the individual devices have been assigned to each group. According to an exemplary embodiment, the device combination generator 630 is configured to generate combinations of devices in one or more device groups based on the device group data. For example, the device combination generator 630 may generate combinations of devices in one or more groups based on binary device status (e.g., active/inactive, on/off, enabled/disabled, etc.), where each combination of devices indicates a potential set of devices that could be active at a given time step to satisfy the load assigned to the subplant and corresponds to a set of control decisions that could be provided to the devices at that time step. Although binary device status is described as the primary control decision used to generate the device combinations, it is contemplated that other control decisions could also be used such as operating setpoints, non-binary control signals that can have values within a given range, etc. The device combination generator 630 may further be configured to generate, store, and/or provide the combinations of devices in the one or more groups in the form of device combination data.

As an illustrative example (hereinafter "Example 1"), the device combination generator 630 may receive device group data indicting there is one device group, which includes three devices (e.g., three similar chillers, three similar pumps, three similar cooling towers, etc.). The device combination generator 630 may generate a list of possible combinations of device statuses in the group. For example, combinations of active devices (e.g., "1") and inactive devices (e.g. "0"). As illustrated in Table 1 below, the device combination generator 630 may generate a list (e.g., device combination data) of eight possible combinations of device statuses for the three devices.

TABLE 1

Combinations of device statuses for three similar devices in a single group.

| Combination | Device 1 | Device 2 | Device 3 |
|---|---|---|---|
| 1 | 0 | 0 | 0 |
| 2 | 1 | 0 | 0 |
| 3 | 0 | 1 | 0 |
| 4 | 0 | 0 | 1 |
| 5 | 1 | 1 | 0 |
| 6 | 1 | 0 | 1 |
| 7 | 0 | 1 | 1 |
| 8 | 1 | 1 | 1 |

As another illustrative example (hereinafter "Example 2"), the device combination generator 630 may receive device group data indicating there are two device groups, each group having two devices. For example, the device combination generator 630 may determine a first device group (e.g., "Group 1") of two similar devices (e.g., chillers, pumps, cooling towers, etc.), and a second device group (e.g., "Group 2") of two similar devices (e.g., chillers, pumps, cooling towers, etc.). The device combination generator 630 may generate possible combinations of device statuses within the groups, for example combinations of active (e.g., "1") and inactive (e.g. "0") devices. As illustrated in Table 2 below, the device combination generator 630 may generate a list (e.g., device combination data) of sixteen possible combinations of device statuses for the two groups.

TABLE 2

Combinations of device statuses for two device groups, each having two devices

| | Group 1 | | Group 2 | |
|---|---|---|---|---|
| Combination | Device 1 | Device 2 | Device 3 | Device 4 |
| 1 | 0 | 0 | 0 | 0 |
| 2 | 1 | 0 | 1 | 0 |
| 3 | 0 | 1 | 0 | 1 |
| 4 | 1 | 1 | 1 | 1 |
| 5 | 0 | 0 | 1 | 1 |
| 6 | 1 | 0 | 0 | 1 |
| 7 | 0 | 1 | 1 | 0 |
| 8 | 1 | 1 | 0 | 0 |
| 9 | 0 | 0 | 1 | 0 |
| 10 | 1 | 0 | 0 | 0 |
| 11 | 0 | 1 | 1 | 1 |
| 12 | 1 | 1 | 0 | 1 |
| 13 | 0 | 0 | 0 | 1 |
| 14 | 1 | 0 | 1 | 1 |
| 15 | 0 | 1 | 0 | 0 |
| 16 | 1 | 1 | 1 | 0 |

The device combination generator 630 may store the device combination data (e.g., in a database, etc.), and/or provide the device combination data to other components of the low level optimizer 534. While Example 1 above illustrates one device group having three devices, it is understood that any number of devices may be in a group (e.g., 5, 10, 20, 25, 50, etc.). Similarly, while Example 2 above illustrates two device groups, each having two devices in each group, it is understood that any number of groups are contemplated (e.g., 3, 5, 6, 10, etc.), with any number of devices in each group (e.g., 5, 10, 20, 25, 50, etc.).

As shown in FIG. 6, the combination profile generator 640 is configured to receive device combination data. According to an exemplary embodiment, the combination profile generator 640 is configured to generate combination profiles based on the device combination data. More specifically, the combination profile generator 640 may generate a combination profile for each of the device combinations generated by the device combination generator 630. Each combination profile may summarize or abstract the information within the corresponding device combination by indicating a total number of active devices within each of the one or more groups without specifying exactly which devices within each group are active, as discussed below.

As an illustrative example, and referring back to Example 1 and Table 1 above, the combination profile generator 640 may receive device combination data of one device group having three devices. The combination profile generator 640 may generate combination profiles indicating the total number of active devices within the group according to each combination. In other words, the combination profile for a given combination may indicate the total number of active (e.g., "1") devices defined by that combination. As illustrated in Table 3 below, the combination profile generator 640 may generate four different combination profiles for the devices in the group (i.e., zero active devices, one active device, two active devices, and three active devices). In this example, combinations 1 and 8 have unique profiles (i.e., "0" and "3" respectively) but combinations 2-4 have the same profile (i.e., "1") and combinations 5-7 have the same profile ("2").

TABLE 3

Combination profiles for three similar devices in a single group.

| Combination | Device 1 | Device 2 | Device 3 | Profile |
|---|---|---|---|---|
| 1 | 0 | 0 | 0 | 0 |
| 2 | 1 | 0 | 0 | 1 |
| 3 | 0 | 1 | 0 | 1 |
| 4 | 0 | 0 | 1 | 1 |
| 5 | 1 | 1 | 0 | 2 |
| 6 | 1 | 0 | 1 | 2 |
| 7 | 0 | 1 | 1 | 2 |
| 8 | 1 | 1 | 1 | 3 |

As another illustrative example, and referring back Example 2 and Table 2 above, the combination profile generator 640 may receive device combination data of two groups, each group having two devices. The combination profile generator 640 may generate a combination profile for each combination indicating the number of active devices (e.g., "1") in each group according to that combination. As shown in Table 4 below, the combination profile generator 640 may generate nine different combination profiles for the two groups (e.g., [0, 0], [0, 1], [0, 2], [1, 0], [1, 1], [1, 2], [2, 0], [2, 1], [2, 2], where the first element in each profile indicates the number of active "Group 1" devices according to that profile and the second element in each profile indicates the number of active "Group 2" devices according to that profile). The number of elements in each combination profile may be the same as the number of device groups such that each combination profile includes an element for each device group.

TABLE 4

Combination profiles for two device groups, each having two devices

| | Group 1 | | Group 2 | | |
|---|---|---|---|---|---|
| Combination | Device 1 | Device 2 | Device 3 | Device 4 | Profile |
| 1 | 0 | 0 | 0 | 0 | 0, 0 |
| 2 | 1 | 0 | 1 | 0 | 1, 1 |
| 3 | 0 | 1 | 0 | 1 | 1, 1 |
| 4 | 1 | 1 | 1 | 1 | 2, 2 |
| 5 | 0 | 0 | 1 | 1 | 0, 2 |
| 6 | 1 | 0 | 0 | 1 | 1, 1 |
| 7 | 0 | 1 | 1 | 0 | 1, 1 |
| 8 | 1 | 1 | 0 | 0 | 2, 0 |
| 9 | 0 | 0 | 1 | 0 | 0, 1 |
| 10 | 1 | 0 | 0 | 0 | 1, 0 |
| 11 | 0 | 1 | 1 | 1 | 1, 2 |
| 12 | 1 | 1 | 0 | 1 | 2, 1 |
| 13 | 0 | 0 | 0 | 1 | 0, 1 |
| 14 | 1 | 0 | 1 | 1 | 1, 2 |
| 15 | 0 | 1 | 0 | 0 | 1, 0 |
| 16 | 1 | 1 | 1 | 0 | 2, 1 |

While Example 1 above illustrates one device group having three devices, which results in four different combination profiles, it is understood that any number of devices may be in the group (e.g., 5, 10, 20, 25, 50, etc.), which may result in any number of different combination profiles. Further, while Example 2 above illustrates two device groups, each having two devices in each group, which results in nine different combination profiles, it is understood that any number of groups with any number of devices is contemplated, which may result in any number of different combination profiles.

The combination profile generator 640 may also be configured to compare combination profiles of one or more combinations, and determine whether the combinations are redundant (e.g., based on the combination profiles). Throughout this disclosure, the term "redundant" is used to describe different combinations that have the same combination profile. Combinations that have the same combination profile (i.e., redundant combinations) have the same number of active devices within each of the groups. Because the devices within a given group can be considered functionally equivalent, the low level optimizer does not need to consider multiple redundant combinations when generating control decisions for the devices as it is expected that redundant combinations will yield the same result.

As an illustrative example, and referring back to Example 1 and Table 3 above, the combination profile generator 640 may compare two combination profiles to determine whether the corresponding combinations are redundant. For example, the combination profile generator 640 may compare the combination profiles of combinations 2 and 3 in Table 3, and determine the combinations are redundant (e.g., one active device in both combinations). Conversely, the combination profile generator 640 may compare the combination profiles of combinations 1 and 2 in Table 3, and determine the combinations are not redundant (e.g., zero active devices in combination 1, and one active device in combination 2).

As another illustrative example, and referring back to Example 2 and Table 4 above, the combination profile generator 640 may compare two combination profiles to determine whether the combinations are redundant. For example, the combination profile generator 640 may compare the combination profiles of combinations 2 and 3 in Table 4, and determine the combinations are redundant (e.g., one active device in Group 1 and one active device in Group 2 for both combinations). Conversely, the combination profile generator 640 may compare the combination profiles of combinations 2 and 4 in Table 4, and determine the combinations are not redundant (e.g., one active device in each of Group 1 and Group 2 for combination 2, but two active devices in each of Group 1 and Group 2 for combination 4).

In an exemplary embodiment, the combination profile generator 640 is configured to store non-redundant combinations and/or the combination profiles in a database or other data storage device that stores the combinations and/or combination profiles to be evaluated by the low level optimizer 534 when generating control signals for the devices. In an exemplary embodiment, the combination profile generator 640 generates a first combination profile, based on a first combination from a set of device combination data, and stores the first combination profile and the first combination in the database 645. The combination profile generator 640 may then generate a second combination profile, based on a second combination from the set of device combination data, and compare the second combination profile to existing combination profiles stored in the database 645 (e.g., the first combination profile). If the combination profile generator 640 determines the second combination is redundant with an existing combination in the database 645 (e.g., if the second combination profile is the same as the first combination profile or any other combination profile already stored in the database 645), the combination profile generator 640 may eliminate the second combination and/or may not store the second combination profile and second combination in the database 645. Conversely, if the combination profile generator 640 determines the second combination is not redundant with an existing combination profile in the database 645 (e.g., the second combination profile is not the same as any other combination profiles in the database 645), the combination profile generator 640 may store the second combination profile and the second combination in the database 645. This process may be repeated until the combination profile generator 640 has generated combination profiles for all combinations in a set of device combination data, compared the combination profiles, and eliminated redundant combinations from inclusion in the database 645.

In some embodiments, the combination profile generator 640 is configured to generate a data set (e.g., in the database 645) that includes all possible combinations and/or combination profiles associated with a set of device combination data. The combination profile generator 640 may then generate a first combination profile, based on a first combination from the set of device combination data, and saves the first combination profile and the first combination in the database 645. The combination profile generator 640 may then generate a second profile, based on a second combination from the set of device combination data, and compare the second combination profile to existing combination profiles stored in the database 645 (e.g., the first combination profile). If the combination profile generator 640 determines the second combination is redundant with an existing combination in the database 645 (e.g., if the second combination profile is the same as the first combination profile or any other combination profile already stored in the database 645), the combination profile generator 640 may remove the second combination from the database 645. Conversely, if the combination profile generator 640 determines the second combination is not redundant with an existing combination in the database 645 (e.g., the second combination profile is not the same as any other combination profiles in the database 645), the combination profile generator 640 may save the second combination profile and the second combination in the database 645. This process may be repeated until the combination profile generator 640 has generated combination profiles for all combinations in a set of combination data, compared the combination profiles, and removed all redundant combinations from the database 645.

The combination profile generator 640 and/or the low level optimizer 534 may then store profile data, which includes all non-redundant combinations and/or combination profiles, in the database 645. The combination profile generator 640 may further provide the profile data to other components of the low level optimizer 534 for further analysis and/or processing.

As shown in FIG. 6, the control signal generator 650 is configured to receive profile data, combination profile data, and/or combination data (e.g., from the combination profile generator 640, the database 645, etc.). In an exemplary embodiment, the control signal generator 650 is configured to optimize the profile data, combination profile data, and/or the combination data and issue control decisions in order to minimize (or maximize) the value of the cost function J(f). For example, the control signal generator 650 may prune the profile data, combination profile data, and/or the combination data to remove branches of the data sets where the control signal generator 650 determines proceeding further will result in an infeasible combination of device control decisions. In addition, the control signal generator 650 may be configured to seed the profile data, combination profile data, and/or the combination data, in order to exclude data sets that do not contain a predetermined device profile (e.g., on/off, binary, etc.). In this regard, the optimization techniques (e.g., searching, pruning, seeding, etc.) of the control signal generator 650 advantageously permit the low level optimizer 534 to more efficiently issue control decisions in order to minimize (or maximize) a value of the cost function J(f).

The control signal generator 650 may process the profile data, combination profile data, and/or the combination data, and provide control decisions to the BMS 506 and/or the asset allocation system 400 to control devices. For example, the control signal generator 650 may provide control decisions that include on/off states and/or operating setpoints for various devices of the subplants 420, indicate whether to participate in incentive events based on the resource allocation set by the asset allocator 402, etc. In an exemplary embodiment, the control signal generator 650 is configured to issue control decisions that control devices according to the combination profiles provided by the combination profile generator 640 and/or the database 645 (e.g., the profile data, combination profile data, and/or the combination data, etc.). In this regard, the control signal generator 650 may be configured to issue control decisions to various devices in order to minimize (or maximize) the value of the cost function J(f).

Categorizing Devices and Optimizing Control Decisions

Referring generally to FIGS. 7-10, processes for categorizing HVAC devices, optimizing combination profiles and/or combinations, and issuing control decisions are shown, according to several embodiments. In an exemplary embodiment, the processes 700-1000 are performed by components of the low level optimizer 534. The processes 700-1000 may be performed in combination with various devices and/or equipment described herein, for example HVAC devices of the HVAC system 100, components of the asset allocation system 400, components of the central plant controller 500, etc. In some embodiments, the processes 700-1000 are performed by other components of the asset allocation system 400 and/or the central plant controller 500, and/or incorporate other suitable devices.

Figure 7:
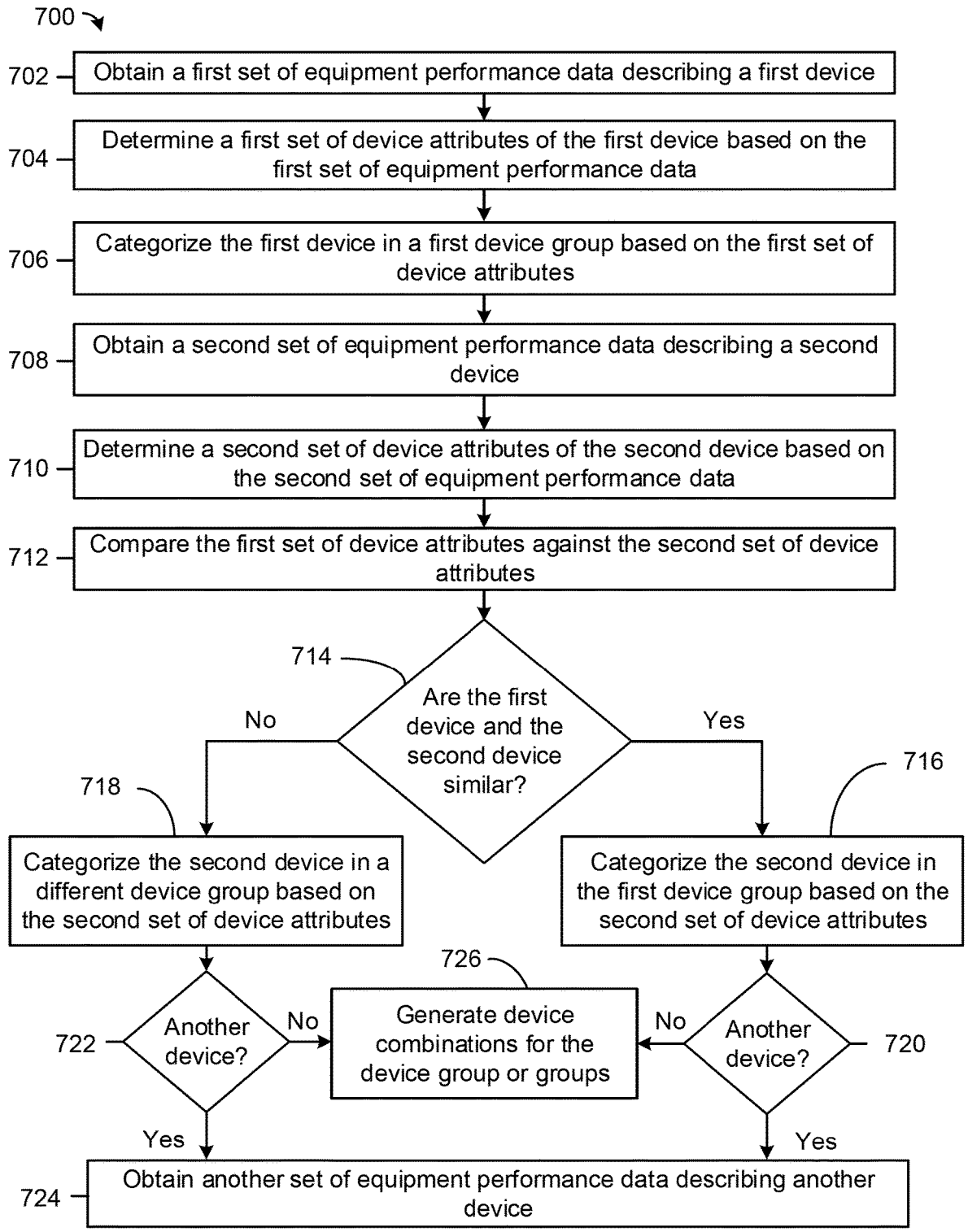
FIG. 7 is a flow diagram of a process for categorizing HVAC devices, according to some embodiments.

Referring now to FIG. 7, a process 700 for categorizing HVAC devices is shown, according to an exemplary embodiment. Process 700 is shown to include obtaining a first set of equipment performance data describing a first device (step 702), according to an exemplary embodiment. The equipment performance data may characterize the operating performance of a device, and/or may be derived from a device, performance, and/or cost configuration that minimizes (or maximizes) the value of a cost function or another optimization technique. Process 700 is also shown to include determining a first set of device attributes of the first device based on the first set of equipment performance data (step 704), according to an exemplary embodiment. The set of device attributes may relate to one or more characteristics of a device. For example, the set device attributes may include a model characteristic derived from a performance model (e.g., a coefficient, model coefficient, etc.), a device parameter (e.g., minimum/maximum energy, power, flow rate, temperature, etc.), and/or any other suitable device characteristic. Process 700 is further shown to include categorizing the first device in a first device group based on the first set of device attributes (step 706), according to an exemplary embodiment. In some embodiments, this categorization of the first device in the first device group is stored (e.g., in a database, memory, etc.).

Process 700 is also shown to include obtaining a second set of equipment performance data describing a second device (step 708), and determining a second set of device attributes based on the second set of equipment performance data (step 710), according to an exemplary embodiment. Process 700 is further shown to include comparing the first set of device attributes against the second set of device attributes (step 712), and determining whether the first device and the second device are similar (step 714), according to an exemplary embodiment. The devices may be determined to be similar if the sets of device attributes are within a predetermined threshold, as discussed above.

If the devices are determined similar, process 700 is shown to include categorizing the second device in the first device group based on the second set of device attributes (step 716), according to an exemplary embodiment. Conversely, if the devices are determined to not be similar, process 700 is shown to include categorizing the second device in a different device group based on the second set of device attributes (step 718), according to an exemplary embodiment. In some embodiments, the categorization of the second device in either the first device group (step 716) or the different device group (step 718) is stored (e.g., in a database, memory, etc.).

Process 700 is shown to also include determining whether there is another device (step 720, step 722), according to an exemplary embodiment. The determination of whether there is another device may be based on the set of equipment performance data and/or available sets of equipment performance data describing other devices. If it is determined there is another device, process 700 is shown to include obtaining another set of equipment performance data describing another device (step 724), according to an exemplary embodiment. Conversely, if it is determined there is not another device, process 700 is shown to include generating device combinations for the device groups (step 726). The process of generating device combinations for the device group or groups is described in greater detail below with reference to FIG. 8 (see step 818 of FIG. 8).

Figure 8:
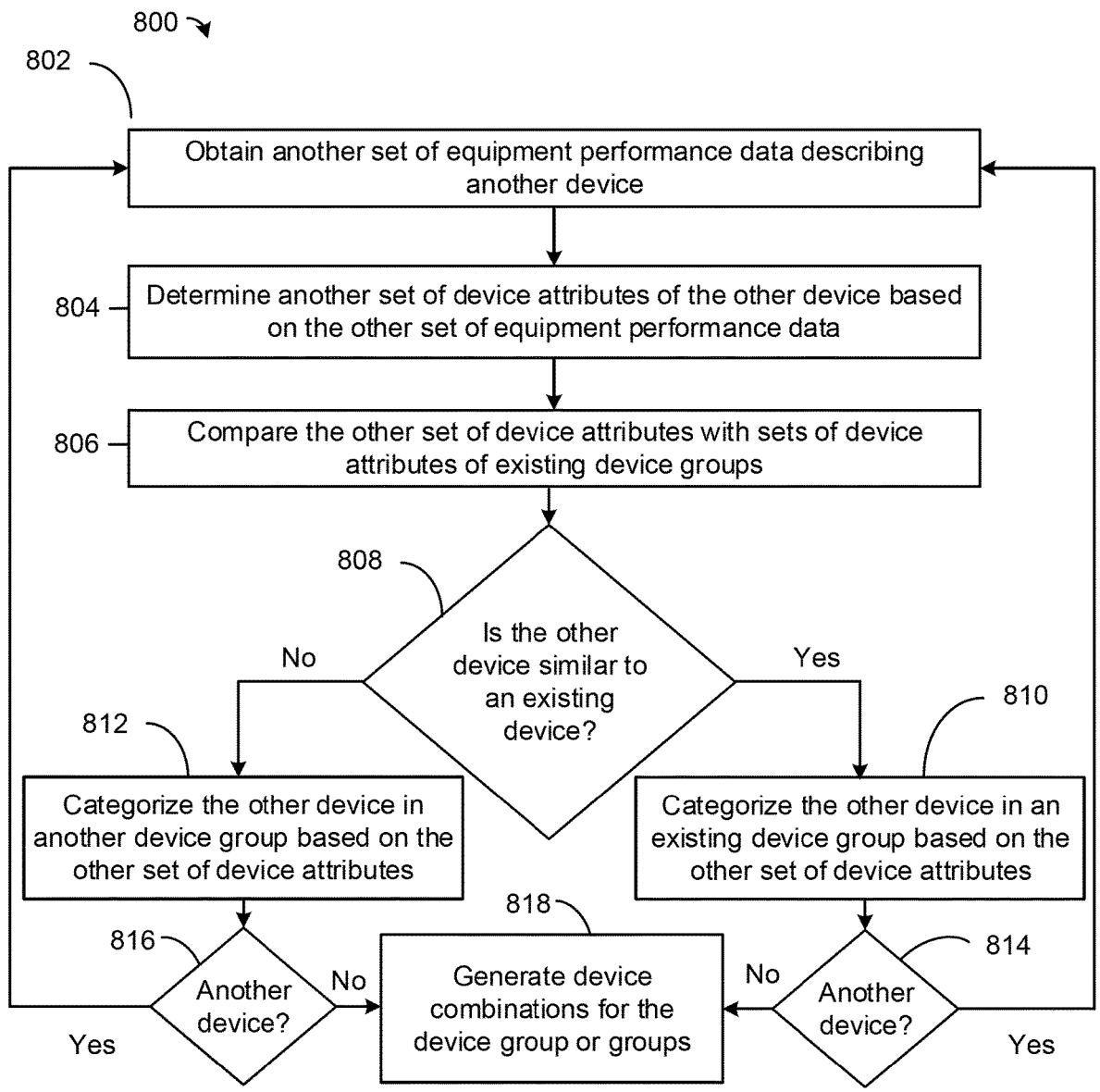
FIG. 8 is a flow diagram of another process for categorizing HVAC devices, according to some embodiments.

Referring now to FIG. 8, another process 800 for categorizing HVAC devices is shown, according to an exemplary embodiment. Process 800 is shown to include obtaining another set of equipment performance data describing another device (step 802), according to an exemplary embodiment. In some embodiments, step 802 is equivalent to step 724 of FIG. 7 (i.e., obtaining another set of equipment performance data describing another device). In this regard, process 800 (e.g., step 802) may be a continuation of the process 700 described above for categorizing HVAC devices. In other embodiments, process 800 (e.g., step 802) is a standalone process, which may be performed with regard to a device categorization data set or system (e.g., a device group data set stored in a database, etc.).

Process 800 is shown to include determining another set of device attributes of the other (i.e., another) device based on the other (i.e., another) set of equipment performance data (step 804), according to an exemplary embodiment. Process 800 is further shown to include comparing the other set of device attributes to sets of device attributes of existing device groups (step 806), and determining whether the other device is similar to an existing device (step 808), according to an exemplary embodiment. In some embodiments, the sets of existing device attributes (and devices) are the device attributes and devices categorized in process 700 of FIG. 7, above. For example, the existing devices may include the first device categorized in the first device group, and the second device categorized in the first device group or a different device group (e.g., which may be stored in a database, memory, etc.). In other embodiments, the existing device attributes (and devices) are device attributes and devices in a device categorization data set or system (e.g., a device group data set stored in a database, etc.).

If the other device is determined to be similar to an existing device, process 800 is shown to include categorizing the other device in an existing device group based on the other set of device attributes (step 810), according to an exemplary embodiment. Conversely, if the other device is determined not to be similar to an existing device, process 800 is shown to include categorizing the other device in another device group based on the other set of device attributes (step 812), according to an exemplary embodiment. In some embodiments, the categorization of the other device in either an existing device group (step 810) or another device group (step 812) is stored (e.g., in a database, memory, etc.).

Process 800 is shown to also include determining whether there is another device (step 814, step 816), according to an exemplary embodiment. The determination of whether there is another device may be based on the set of equipment performance data (e.g., available sets of equipment performance data describing another device, etc.). If it is determined there is another device, process 800 is shown to repeat process 800 by obtaining another set of equipment performance data describing another device (step 802). Conversely, if it is determined there is not another device (e.g., there is no additional equipment performance data, available sets of equipment performance data of another device, etc.), process 800 is shown to include generating device combinations for the device group or groups (step 818). In some embodiments, prior to step 818 the categorization of the devices into groups (e.g., existing groups, different groups, etc.) is stored (e.g., in a database, memory, etc.).

According to an exemplary embodiment, generating device combinations in the device group or groups includes generating combinations of devices based on binary device status, as discussed above. In an exemplary embodiment, each combination of devices indicates a potential set of devices that could be active at a given time step to satisfy the load assigned to the subplant and corresponds to a set of control decisions that could be provided to the devices at that time step. The combinations may be compiled and/or stored (e.g., in a database, memory, etc.), for example as a list of possible combinations of active devices in the groups. In some embodiments, the combinations are used in other processes, for example processes for optimizing combination profiles and/or issuing control decisions, as discussed in processes 900-1000, below.

Figure 9:
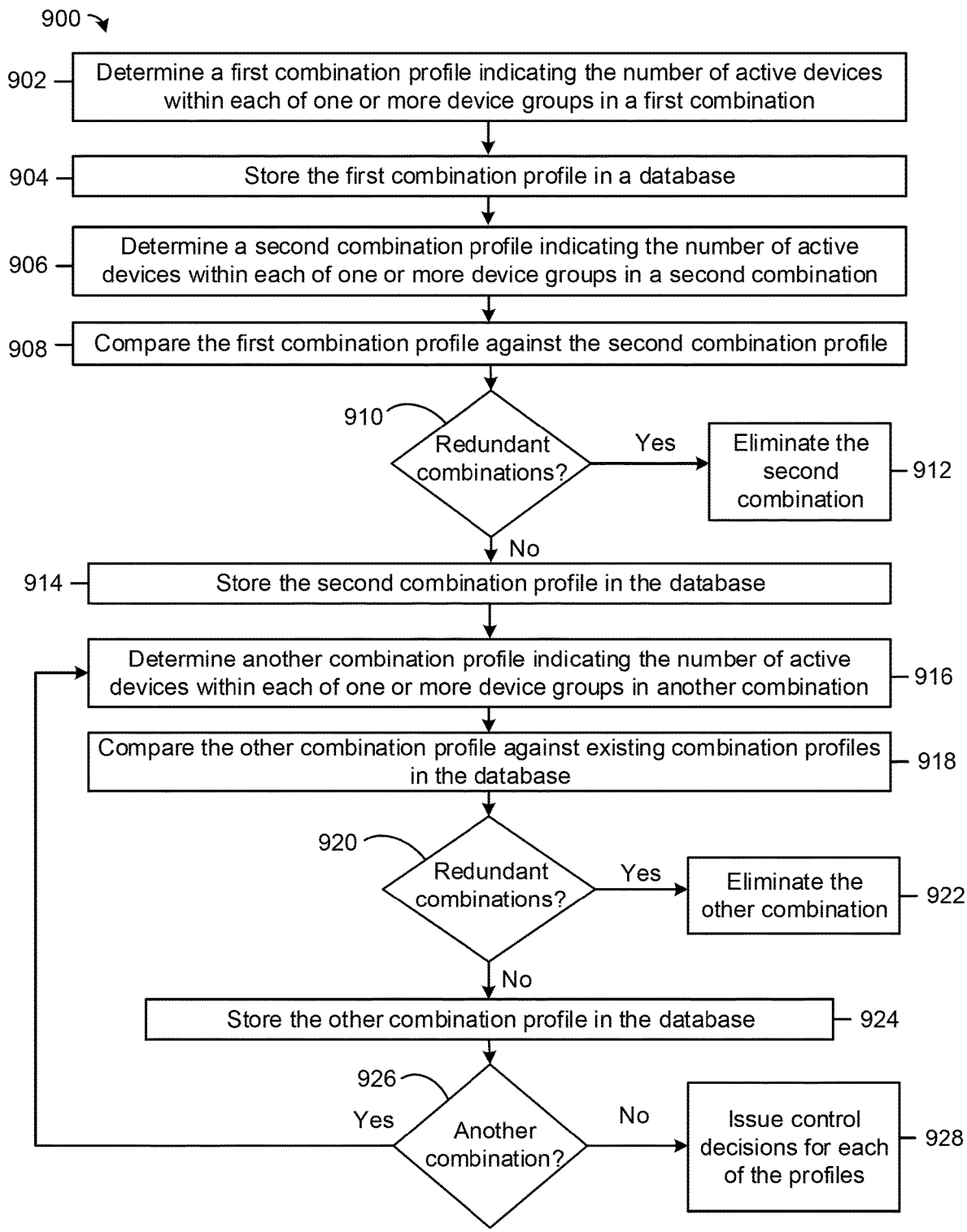
FIG. 9 is a flow diagram of a process for optimizing device combination profiles and issuing control decisions, according to some embodiments.

Referring now to FIG. 9, a process 900 for optimizing device combination profiles and issuing control decisions is shown, according to an exemplary embodiment. In an exemplary embodiment, process 900 utilizes an existing list of possible device combinations within one or more groups. For example, process 900 may utilize the list of possible device combinations in one or more groups generated in step 726 of FIG. 7 and/or step 818 of FIG. 8, discussed above.

Process 900 is shown to include determining a first combination profile indicating a number of active devices within each of one or more device groups in a first combination (step 902), according to an exemplary embodiment. Process 900 is also shown to include storing the first combination profile in a database (step 904), according to an exemplary embodiment. In some embodiments, process 900 includes storing the first combination profile and/or the first combination in the database.

Process 900 is shown to include determining a second combination profile indicating the number of active devices within each of the one or more devices groups in a second combination (step 906), according to an exemplary embodiment. Process 900 is further shown to include comparing the first combination profile against the second combination profile (step 908), and determining whether the combinations are redundant (step 910). The combinations may be redundant if it is determined the first combination profile is the same as the second combination profile, as discussed above.

If the first and second combinations are determined to be redundant, process 900 is shown to include eliminating the second combination (step 912) (e.g., a redundant combination, a redundant combination profile), according to an exemplary embodiment. In some embodiments, eliminating the second combination includes not storing the second combination profile and/or the second combination in the database. Conversely, if the first and second combinations are not redundant, process 900 is shown to include storing the second combination profile in the database, according to an exemplary embodiment. In some embodiments, if the first and second combinations are not redundant, process 900 includes storing the second combination profile and/or the second combination in the database.

Process 900 is shown to also include determining another combination profile indicating the number of active devices within each of the one or more device groups in another combination (step 916), according to an exemplary embodiment. In some embodiments, another combination profile may not be determined (e.g., another combination does not exist, no additional combinations are available, etc.), in which case process 900 may include issuing control decisions for the combination profiles and/or the combinations stored in the database (e.g., the first combination profile and/or the second combination profile).

Process 900 is further shown to include comparing the other (i.e., another) combination profile against existing combination profiles in the database (step 918), and determining whether the other combination is redundant with an existing combination in the database (e.g., if the other combination profile is the same as any other combination profile already stored in the database) (step 920). For example, the other combination profile may be compared to the first combination profile stored in the database (e.g., at step 904), and in some instances, the second combination profile stored in the database (e.g., if the second combination is determined not to be redundant with the first combination at step 910 and the second combination profile is stored in the database at step 914). In some embodiments, the other combination is compared to other existing combinations stored in the database, for example if portions of the process 900 are repeated for a plurality of combinations, as discussed below.

If the other combination is determined to be redundant with an existing combination, process 900 is shown to include eliminating the other combination (step 922), according to an exemplary embodiment. In some embodiments, eliminating the other combination includes not storing the other combination profile and/or the other combination in the database. Conversely, if the other combination is not redundant with an existing combination, process 900 is shown to include storing the other combination profile in the database (step 924). In this regard, process 900 (e.g., step 920-924) may be configured to eliminate redundant combination profiles (and corresponding combinations) from a list of possible combinations, and/or store only non-redundant combination profiles and/or combinations in the database.

Process 900 is further shown to include determining whether there is another device combination (step 926). The determination of whether there is another combination may be based on the list of possible combinations generated in step 818 of FIG. 8 (e.g., the number of combinations in the list of possible combinations). If it is determined there is another combination, process 900 is shown to repeat portions of process 900 by determining another combination profile indicating the number of active devices within each of the one or more device groups in the other (i.e., another) combination (step 916). If it is determined there is not another combination, process 900 is shown to include issuing control decisions for each of the combination profiles stored in the database (step 928), according to an exemplary embodiment. In some embodiments, if it is determined there is not another combination, process 900 includes issuing control decisions for each of the combination profiles and/or combinations stored in the database. The process of issuing control decisions for each of the combination profiles and/or combinations stored in the database is described in greater detail below with reference to FIG. 10 (see step 1030 of FIG. 10).

Figure 10:
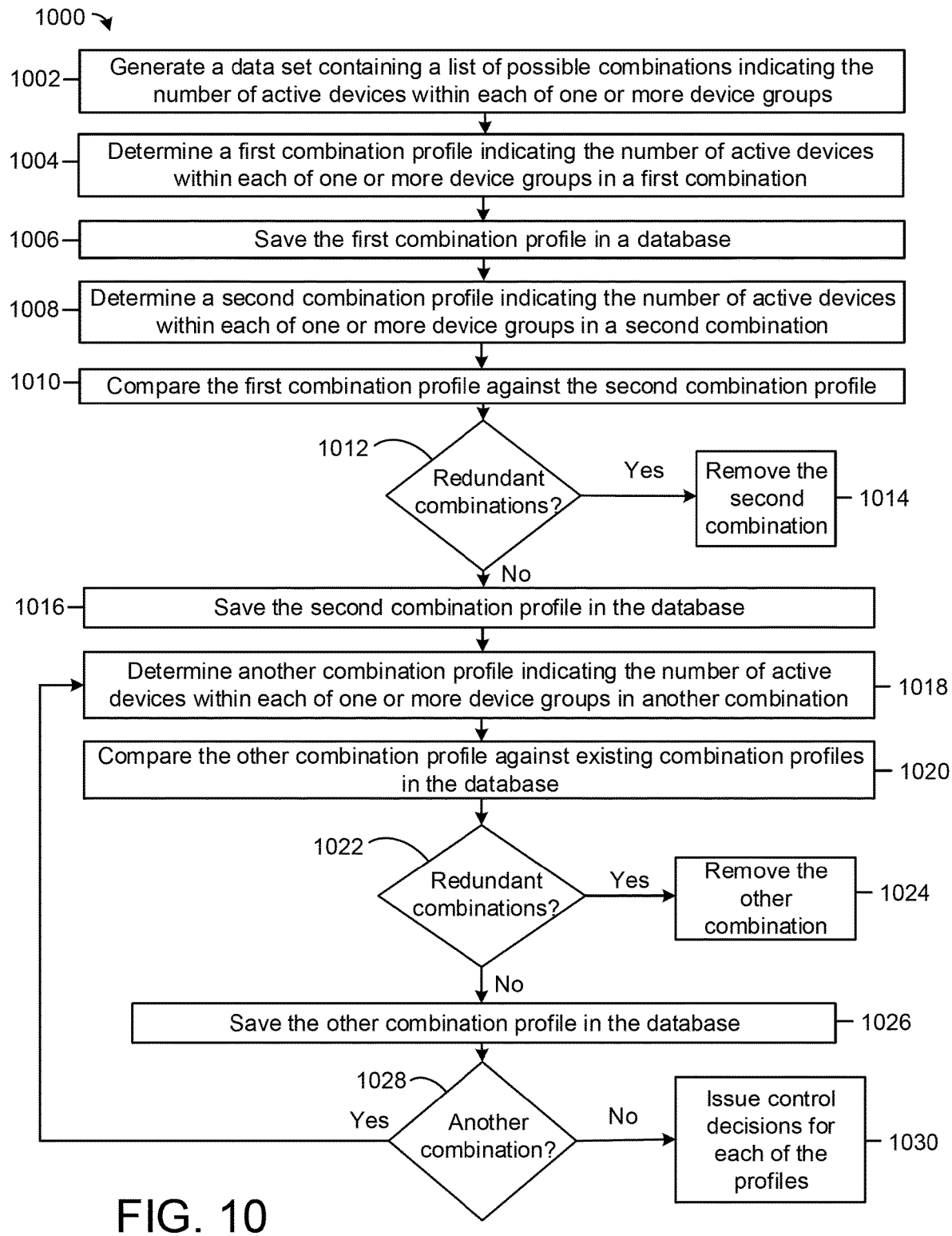
FIG. 10 is a flow diagram of another process for optimizing device combination profiles and issue control decisions, according to some embodiments.

Referring now to FIG. 10, a process 1000 for optimizing device combination profiles and issuing control decisions is shown, according to an exemplary embodiment. Process 1000 is shown to include generating a data set containing a list of possible combinations indicating the number of active devices within each of the one or more device groups (step 1002), according to an exemplary embodiment. In some embodiments, the combinations in the data set generated at step 1002 may be obtained from the processes described at step 818 of FIG. 8 (e.g., generating device combinations in the device group or groups). In this regard, process 1000 may be a continuation of process 800 described above for categorizing HVAC devices. In some embodiments, the data set of possible combinations is stored in a database.

Process 1000 is shown to include determining a first combination profile indicating the number of active devices within each of the one or more device groups in a first combination (step 1004), and saving the first combination profile in a database (step 1006), according to an exemplary embodiment. In some embodiments, the process 1000 includes saving the first combination profile and/or the first combination in the database. Process 1000 further is shown to include determining a second combination profile indicating the number of active devices within each of the one or more device groups in a second combination (step 1008), according to an exemplary embodiment.

Process 1000 is also shown to include comparing the first combination profile against the second combination profile (step 1010), and determining whether the first and second combinations are redundant (e.g., if the second combination profile is the same as the first combination profile) (step 1012), according to an exemplary embodiment. If it is determined that the first and second combinations are redundant, process 1000 is shown to include removing the second combination from the database (step 1014). Conversely, if the first and second combinations are not redundant, process 1000 is shown to include saving the second combination profile in the database (step 1016). In some embodiments, if the first and second combinations are not redundant, process 1000 includes saving the second combination profile and/or the second combination in the database.

Process 1000 is further shown to include determining another combination profile indicating the number of active devices within each of the one or more device groups in another combination (step 1018). In some embodiments, another combination profile may not be determined (e.g., another combination does not exist, etc.), in which case process 1000 may include issuing control decisions for the combination profiles and/or the combinations saved in the database.

Process 1000 also shown to include comparing the other combination profile against existing combination profiles saved in the database (step 1020), and determining whether the other combination is redundant with an existing combination in the profile database (e.g., if the other combination profile is the same as any other combination profile already stored in the database) (step 1022). In some embodiments, the other combination profile is compared to the first combination profile (e.g., saved in step 1006), the second combination profile (e.g., if saved in step 1016), and/or other existing combination profiles, as discussed below. If the other combination is determined to be redundant with an existing combination in the database, process 1000 is shown to include removing the other combination from the database (step 1024), according to an exemplary embodiment. Conversely, if the other combination profile is not redundant with an existing combination profile in the profile database, process 1000 is shown to include saving the other combination profile in the database (step 1026). In this regard, process 1000 (e.g., steps 1022-1026) may be configured to remove redundant combinations from a database of all potential combinations, and/or save only non-redundant combination profiles (and/or combinations) in the database.

Process 1000 is further shown to include determining whether there is another device combination (step 1028), according to an exemplary embodiment. If it is determined there is another device combination, process 1000 is shown to repeat portions of process 1000 by determining another combination profile indicating the number of active devices within each of the one or more device groups in the other (i.e., another) combination (step 1016). If it is determined there is not another device combination, process 1000 is shown to include issuing control decisions for each of the combination profiles stored in the database (step 1030), according to an exemplary embodiment.

According to an exemplary embodiment, issuing control decisions relates to a determination as to how to best run one or more devices. For example, the control decisions may include on/off states and/or operating setpoints for various devices, an indication whether to participate in incentive events based on a resource allocation, etc. In an exemplary embodiment, the control decisions are issued to one or more devices based on the combination profiles stored in the profile database. In this regard, the control decisions may be configured to operate one or more devices in order to maximize (or minimize) the value of a cost function.

The processes described herein of categorizing similar devices into device groups, determining combinations based on the status of devices within the groups, generating combination profiles for the combinations, and eliminating/removing redundant combination profiles advantageously reduces/eliminates redundant device combinations that may be considered in a more expansive analysis of how to best run devices in order to maximize (or minimize) the value of a cost function. More specifically, given that similar devices display similar operating characteristics and/or operating costs, grouping similar devices together and eliminating/removing redundant combination profiles that include the same number of active devices advantageously eliminates/removes redundant calculations and/or control decisions that would result in similar cost determinations. This eliminating/removing redundant combinations increases the speed and efficiency of the optimization process, as well as the process of issuing control decisions to components of the asset allocation system 400 and/or the BMS 506 in order to achieve a minimum (or maximum) value of a cost function. For example, in a situation involving one group of similar devices having 18 devices, the process of removing/eliminating redundant combination profiles speeds up the optimization process and/or issuing control decisions by 14,500 times. In addition, the process of removing/eliminating redundant combination profiles increases the functionality of the devices described herein (e.g., the central plant controller 500) by reducing the computational power needed during the optimization process (e.g., searching, filtering, analyzing, etc.) compared to more expansive optimization analysis.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A system for controlling building equipment devices, the system comprising:
a processing circuit comprising a processor and memory storing instructions executed by the processor, the processing circuit configured to:
generate a first combination profile indicating a number of active devices within each of one or more device groups according to a first combination of the building equipment devices;
generate a second combination profile indicating a number of active devices within each of the one or more device groups according to a second combination of the building equipment devices;
compare the first combination profile against the second combination profile to determine whether the first combination is redundant with the second combination, wherein in response to determining the first combination and the second combination are redundant, the system is further configured to (i) store the first combination profile in a database and eliminate the second combination or (ii) delete the second combination from the database;
generate control decisions for the building equipment devices based on whether the first combination is redundant with the second combination; and
operate the building equipment devices in accordance with the control decisions.

2. The system of claim 1, wherein in response to determining the first combination and the second combination are not redundant, the system is further configured to store the first combination profile and the second combination profile in a database.

3. The system of claim 2, wherein the system is further configured to:
generate a third combination profile indicating a number of active devices within each of the one or more device groups according to a third combination of the building equipment devices; and
compare the third combination profile against existing combination profiles stored in the database.

4. The system of claim 3, where in response to determining the third combination and existing combinations stored in the database are not redundant, the system is further configured to store the third combination profile in the database.

5. The system of claim 1, wherein the system is further configured to:
generate a database including a plurality of combinations of the building equipment devices indicating a number of active devices within each of the one or more device groups according to the plurality of combinations of the building equipment devices; and
save a first combination profile in the database indicating a number of active devices within each of the one or more device groups according to a first combination of the building equipment devices.

6. A system for controlling building equipment devices, the system comprising:
a processing circuit comprising a processor and memory storing instructions executed by the processor, the processing circuit configured to:
categorize a first building equipment device and a second building equipment device into either a single device group or into different device groups by comparing a first set of device attributes of the first building equipment device to a second set of device attributes of the second building equipment device, wherein the system is further configured to:
determine the first set of device attributes of the first building equipment device and the second set of device attributes of the second building equipment device are similar based on an error or difference between the first set of device attributes and the second set of device attributes being below a threshold; and
in response to the first set of device attributes of the first building equipment device and the second set of device attributes of the second building equipment device being similar, categorize the first building equipment device and the second building equipment device into the single device group;
generate control decisions for the first building equipment device and the second building equipment device based on whether the first building equipment device and the second building equipment device are categorized into the single device group or into the different device groups; and
operate the first building equipment device and the second building equipment device according to the control decisions.

7. The system of claim 6, wherein the system is further configured to:
obtain a first set of equipment performance data characterizing an operating performance of the first building equipment device and a second set of equipment performance data characterizing an operating performance of the second building equipment device; and
generate the first set of device attributes of the first building equipment device based on the first set of equipment performance data and the second set of device attributes of the second building equipment device based on the second set of equipment performance data.

8. The system of claim 6, wherein the first set of device attributes of the first building equipment device includes a first equipment model coefficient and the second set of device attributes of the second building equipment device includes a second equipment model coefficient.

9. The system of claim 6, wherein the first set of device attributes of the first building equipment device includes a first device parameter and the second set of device attributes of the second building equipment device includes a second device parameter.

10. The system of claim 6, wherein in response to the first set of device attributes of the first building equipment device and the second set of device attributes of the second device not being similar, the system is further configured to categorize the first building equipment device and the second building equipment device into the different device groups.

11. A method for controlling building equipment devices, comprising:
- generating a first combination profile indicating a number of active devices within each of one or more device groups according to a first combination of the building equipment devices;
- generating a second combination profile indicating a number of active devices within each of the one or more device groups according to a second combination of the building equipment devices;
- comparing the first combination profile against the second combination profile to determine whether the first combination is redundant with the second combination, wherein in response to determining the first combination and the second combination are redundant, the method further comprises storing the first combination profile in a database and eliminating the second combination;
- generating control decisions for the building equipment devices based on whether the first combination is redundant with the second combination; and
- operating the building equipment devices in accordance with the control decisions.

12. The method of claim 11, wherein in response to determining the first combination and the second combination are not redundant, the method further comprises storing the first combination profile and the second combination profile in a database.

13. The method of claim 11, further comprising:
- generating a third combination profile indicating a number of active devices within each of the one or more device groups according to a third combination of the building equipment devices; and
- comparing the third combination profile against existing profiles stored in a database.

14. The method of claim 13, where in response to determining the third combination and existing combinations stored in the database are not redundant, the method further comprises storing the third combination profile in the database.

* * * * *